United States Patent
Yamane et al.

(10) Patent No.: US 11,143,118 B2
(45) Date of Patent: Oct. 12, 2021

(54) CONTROL DEVICE AND CONTROL METHOD FOR VEHICLE

(71) Applicant: MAZDA MOTOR CORPORATION, Hiroshima (JP)

(72) Inventors: Yuichiro Yamane, Aki-gun (JP); Akira Tsuda, Aki-gun (JP); Yuki Ishiyama, Aki-gun (JP); Takefumi Takada, Aki-gun (JP); Yuto Sakasegawa, Aki-gun (JP); Kazuki Kawamoto, Aki-gun (JP); Jumpei Takeda, Aki-gun (JP); Hiroyuki Morioka, Aki-gun (JP); Shin Kato, Aki-gun (JP); Masahiro Nagoshi, Aki-gun (JP); Atsushi Yamasaki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/058,284

(22) PCT Filed: May 20, 2019

(86) PCT No.: PCT/JP2019/019897
§ 371 (c)(1),
(2) Date: Nov. 24, 2020

(87) PCT Pub. No.: WO2019/230476
PCT Pub. Date: Dec. 5, 2019

(65) Prior Publication Data
US 2021/0199059 A1      Jul. 1, 2021

(30) Foreign Application Priority Data

May 30, 2018   (JP) .............................. JP2018-103328

(51) Int. Cl.
*F02D 11/10*      (2006.01)
*B60W 30/188*    (2012.01)
(Continued)

(52) U.S. Cl.
CPC ......... *F02D 11/105* (2013.01); *B60W 30/188* (2013.01); *B60W 30/20* (2013.01);
(Continued)

(58) Field of Classification Search
CPC .. F02D 11/105; F02D 41/107; F02D 2250/18; F02D 2250/602; F02D 29/02;
(Continued)

(56) References Cited

U.S. PATENT DOCUMENTS

2006/0234829 A1\* 10/2006 Berger ................ F16H 57/0006
477/52
2008/0300760 A1\* 12/2008 Sawada ............... B60W 30/188
701/54

(Continued)

FOREIGN PATENT DOCUMENTS

JP       2006017001 A     1/2006

OTHER PUBLICATIONS

European Patent Office, Extended European Search Report Issued in Application No. 19811911.7, dated Jun. 8, 2021, Germany, 9 pages.

*Primary Examiner* — George C Jin
(74) *Attorney, Agent, or Firm* — Alleman Hall Creasman & Tuttle LLP

(57) ABSTRACT

To provide a control device for a vehicle capable of controlling the torque of a drive source so as to appropriately balance the suppression of body vibrations and the securing of a transient response during acceleration or deceleration. This control device for a vehicle includes an accelerator position sensor that detects the accelerator opening, a torque adjustment mechanism such as a throttle valve that adjusts
(Continued)

the torque of an engine as the drive source of the vehicle, and a powertrain control module (PCM) that controls the torque adjustment mechanism based on the accelerator opening. The PCM sets the target acceleration of the vehicle based on the accelerator opening, sets the target torsion angle of the drive shaft based on the target acceleration, sets the target torque of the engine based on the target torsion, and controls the torque adjustment mechanism based on the target torque.

20 Claims, 22 Drawing Sheets

(51) Int. Cl.
  *B60W 30/20* (2006.01)
  *F02D 41/10* (2006.01)
  *F02D 29/02* (2006.01)

(52) U.S. Cl.
  CPC ........ *F02D 41/107* (2013.01); *B60W 2540/10* (2013.01); *B60W 2540/16* (2013.01); *F02D 29/02* (2013.01); *F02D 2200/501* (2013.01); *F02D 2200/602* (2013.01); *F02D 2250/18* (2013.01)

(58) Field of Classification Search
  CPC .......... F02D 2200/501; B60W 30/188; B60W 30/20; B60W 2540/10; B60W 2540/16
  See application file for complete search history.

(56) References Cited

U.S. PATENT DOCUMENTS

2018/0073454 A1    3/2018  Kono et al.
2020/0096062 A1*   3/2020  Smith ..................... F16D 48/02
2020/0309256 A1*  10/2020  Kim ..................... F16H 61/0204

* cited by examiner

CONTROL DEVICE AND CONTROL METHOD FOR VEHICLE

TECHNICAL FIELD

The present invention relates to a control device and a control method for a vehicle that control the torque of a drive source based on an accelerator opening.

BACKGROUND ART

Conventionally, the target torque of the engine (drive source) of a vehicle is set based on the accelerator opening corresponding to the driver's operation of an accelerator pedal, and the engine is controlled based on this target torque. However, during acceleration or deceleration of a vehicle, when the engine is controlled by directly using the target torque according to the accelerator opening described above, body vibrations may occur due to the torsion of the drive shaft that drives wheels and the backlash of a gear in a power transmission system to which the torque of the engine is transmitted.

Generally, processing for dampening changes in the target torque during acceleration or deceleration is performed (such as processing for wholly or partially smoothing the rise or fall of the target torque) to suppress such body vibrations. For example, Patent Literature 1 discloses a technique that calculates the change rate of the torsion angle of a drive shaft and temporally reduces or increases the torque when the change rate is larger than an allowable limit.

CITATION LIST

Patent Literature

Patent Literature 1: JP-A-2006-17001

SUMMARY OF INVENTION

Technical Problem

However, when the processing that dampens changes in the target torque is performed during acceleration or deceleration as described above, body vibrations can be suppressed, but the response (transient response) during acceleration or deceleration is reduced. More specifically, the acceleration performance and the deceleration performance degrade.

The present invention is developed to solve the above-mentioned problems of the conventional technology with an object of providing a control device and a control method for a vehicle that can control the torque of a drive source so as to appropriately balance the suppression of body vibrations and the securing of a transient response during acceleration or deceleration.

Solution to Problem

To achieve the object described above, according to the present invention, there is provided a control device for a vehicle, including an accelerator position sensor that detects an accelerator opening; a torque adjustment mechanism that adjusts a torque of a drive source of the vehicle; and a controller that controls the torque adjustment mechanism based on the accelerator opening detected by the accelerator position sensor, in which the controller sets a target acceleration based on the accelerator opening, sets a target torsion angle of a drive shaft that drives a wheel of the vehicle based on the target acceleration, sets a target torque of the drive source based on the target torsion, and controls the torque adjustment mechanism based on the target torque.

In the present invention configured as described above, the controller controls the torque adjustment mechanism by setting the target torsion angle of the drive shaft based on the target acceleration according to the accelerator opening and setting the target torque of the drive source based on this target torsion. This can apply the target torque that considers the behavior of the drive shaft during acceleration or deceleration (that is, during transient of torque increase or torque reduction) and secure the response (transient response) during acceleration or deceleration while suppressing body vibrations caused by the torsion of the drive shaft.

In the present invention, preferably, the controller sets the target torque based on a first torque according to the torsion angle of the drive shaft and a second torque according to a torsion angular velocity of the drive shaft to achieve the target torsion angle.

In the present invention configured as described above, the target torque that appropriately considers the behavior of the drive shaft can be applied. Application of this target torque can appropriately generate the actual torsion angle corresponding to the target torsion angle and effectively suppress vibrations caused by the torsion of the drive shaft.

In the present invention, preferably, the target torque increases according to the first torque and, in the increasing process, has a time waveform including a temporary drop according to the second torque.

In the present invention configured as described above, it is possible to apply the target torque that more effectively considers the behavior of the drive shaft during transient of torque increase or torque reduction.

In the present invention, preferably, the controller corrects the target torque based on a difference between the target torsion angle and an actual torsion angle of the drive shaft.

In the present invention configured as described above, the actual torsion angle according to the target torsion angle can be appropriately achieved by, for example, the feedback control of the torque based on the difference between the target torsion angle and the actual torsion angle.

In the present invention, preferably, the controller calculates the actual torsion angle based on a difference between an angular velocity on a side of the drive source and an angular velocity on a side of the wheel.

In the present invention configured as described above, the actual torsion angle can be calculated accurately.

In the present invention, preferably, the controller calculates the angular velocity on the side of the drive source based on the torque of the drive source, calculates the angular velocity on the side of the wheel based on a travel resistance of the vehicle, and calculates the actual torsion angle based on the difference between the angular velocities.

In the present invention configured as described above, the actual torsion angle can be calculated more accurately.

In the present invention, preferably, the controller calculates the actual torsion angle of the drive shaft based on the difference between the angular velocity on the side of the drive source and the angular velocity on the side of the wheel and corrects the target torque from when the actual torsion angle becomes zero to when the actual torsion angle changes in a drive direction of the wheel or a deceleration direction.

In the present invention configured as described above, during acceleration or deceleration of the vehicle, the backlash reduction of the gear in the power transmission system to which the torque of the drive source is transmitted can be quickly completed, thereby improving the response (transient response) during acceleration or deceleration.

In the present invention, preferably, the controller calculates the actual torsion angle of the drive shaft based on the difference between the angular velocity on the side of the drive source and the angular velocity on the side of the wheel and controls the torque adjustment mechanism so as to reduce the torque of the drive source when the actual torsion angle changes in the drive direction of the wheel from zero.

When the actual torsion angle changes in the drive direction from zero, the backlash of the gear in the power transmission system to which the torque of the drive source is transmitted is reduced. Therefore, by reducing the torque of the drive source at this time, body vibrations (backlash reduction shock) that occur when the backlash of the gear is reduced during acceleration can be appropriately suppressed.

In the present invention, preferably, the drive source includes an engine, the torque adjustment mechanism includes an air amount adjustment device that adjusts an amount of air supplied to the engine, and the controller corrects the target torque so as to compensate for a response delay of the air amount adjustment device.

In the present invention configured as described above, the delay of the engine output with respect to the driver's acceleration or deceleration request due to the response delay of the air amount adjustment device can be appropriately suppressed.

In the present invention, preferably, the drive source includes the engine or a motor.

According to another aspect, there is provided a control method for a control method for a vehicle having an accelerator position sensor that detects an accelerator opening and a torque adjustment mechanism that adjusts a torque of a drive source of the vehicle, the control method including a step of setting a target acceleration of the vehicle based on the accelerator opening; a step of setting a target torsion angle of a drive shaft that drives a wheel of the vehicle based on the target acceleration; a step of setting a target torque of the drive source based on the target torsion; and a step of controlling the torque adjustment mechanism based on the target torque.

Advantageous Effects of Invention

The control device and control method for a vehicle according to the present invention can control the torque of the drive source so as to appropriately balance the suppression of body vibrations and the securing of a transient response during acceleration or deceleration.

DESCRIPTION OF EMBODIMENTS

A control device and a control method for a vehicle according to an embodiment of the present invention will be described with reference to the attached drawings.

<Device Structure>

Figure 1:
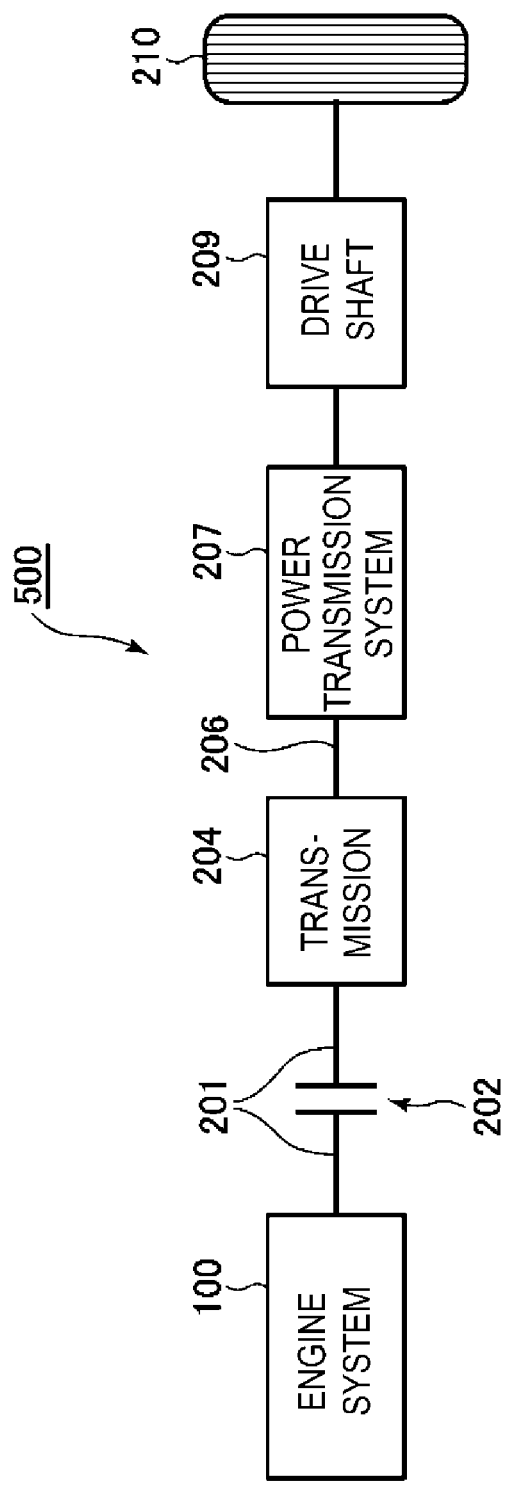
FIG. 1 is a schematic structural diagram illustrating a vehicle to which a control device for a vehicle according to an embodiment of the present invention has been applied.

First, an overview of the vehicle to which the control device of a vehicle according to the embodiment of the present invention has been applied will be described with reference to FIG. 1. FIG. 1 is a schematic structural diagram illustrating the vehicle to which the control device for a vehicle according to the embodiment of the present invention has been applied.

As illustrated in FIG. 1, a vehicle 500 mainly includes an engine system 100 that has an engine (drive source) generating a driving force, a transmission 204 that changes the rotational speed of the engine of this engine system 100, a power transmission system 207 that transmits the driving force from the transmission 204 to a downstream side, a drive shaft 209 that drives wheels 210 by the driving force from the power transmission system 207, and the wheels 210.

The output shaft of the engine system 100 and the rotary shaft of the transmission 204 are coaxially joined to each other by a shaft 201 via a disengageable clutch 202. The clutch 202 includes a dry multi-plate clutch capable of changing the transmission torque capacity by controlling the flowrate and the pressure of clutch hydraulic oil continuously or stepwise via a motor (not illustrated). A flywheel having a predetermined weight is provided on the shaft 201 (not illustrated). It should be noted here that the clutch 202 only needs to at least engage and disengage the transmission of the driving force between the engine system 100 and the transmission 204 and may also be formed inside the transmission 204.

The driving force is input to the power transmission system 207 via the output shaft 206 of the transmission 204. The power transmission system 207 includes a differential gear that distributes the driving force to the pair of left and right wheels 210, a final gear, and the like.

Figure 2:
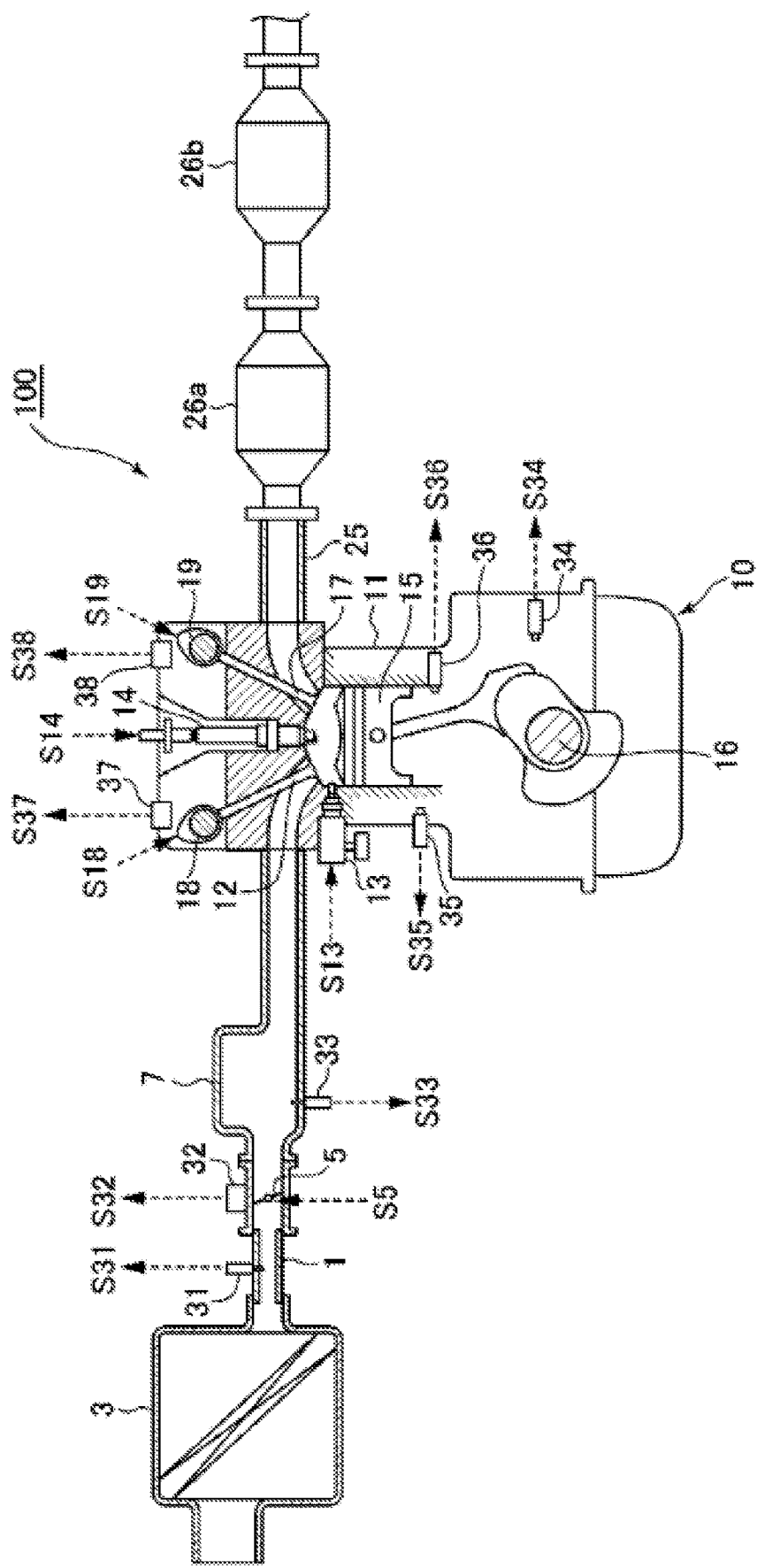
FIG. 2 is a schematic structural diagram illustrating an engine system to which the control device for a vehicle according to the embodiment of the present invention has been applied.

Next, with reference to FIGS. 2 and 3, the engine system to which the control device for a vehicle according to the embodiment of the present invention has been applied will be described. FIG. 2 is a schematic structural diagram illustrating an engine system to which the control device for a vehicle according to the embodiment of the present invention has been applied and FIG. 3 is a block diagram illustrating the electrical structure of the control device for a vehicle according to the embodiment of the present invention.

Figure 3:
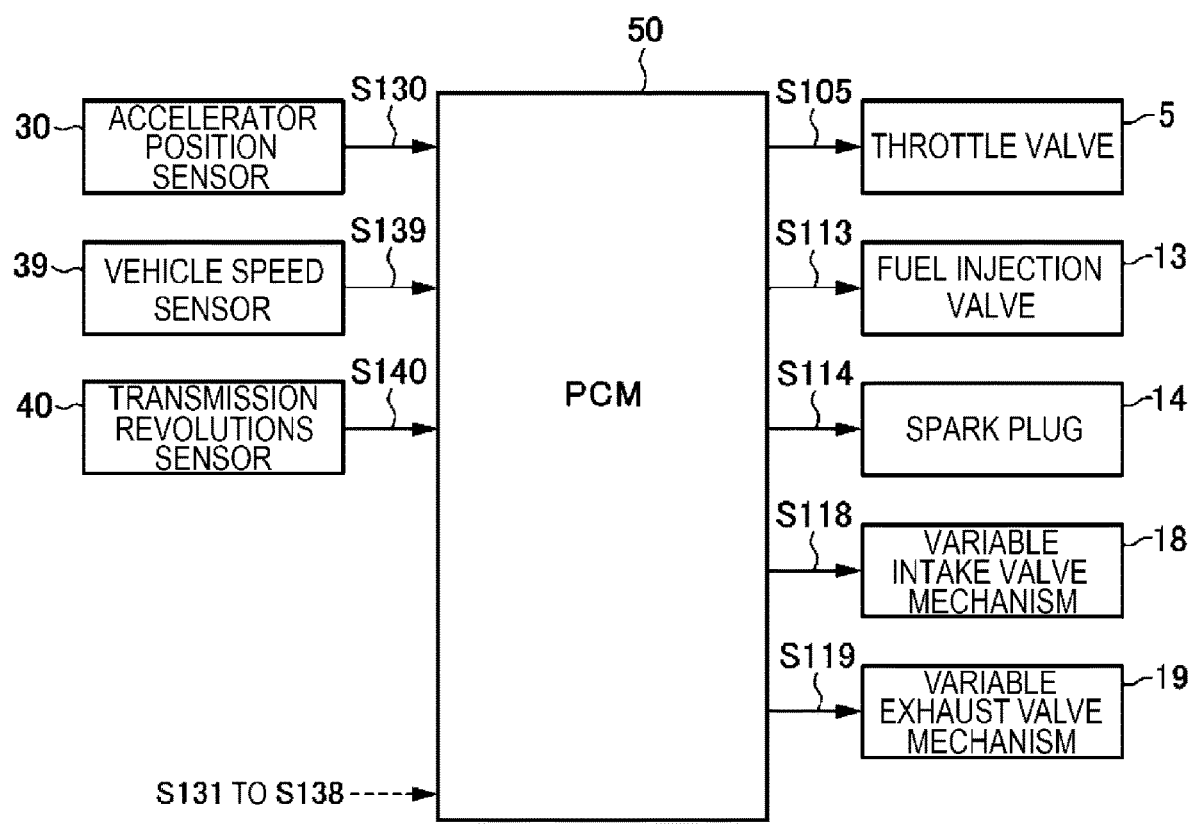
FIG. 3 is a block diagram illustrating the electric structure of the control device for a vehicle according to the embodiment of the present invention.

As illustrated in FIGS. 2 and 3, the engine system 100 mainly includes an intake passage 1 through which intake air (air) introduced from the outside passes, an engine 10 (specifically, a gasoline engine) that generates a driving force of the vehicle 500 by burning an air-fuel mixture of the intake air supplied through this intake passage 1 and the fuel supplied from a fuel injection valve 13 described later, an exhaust passage 25 through which the exhaust gas generated by combustion in this engine 10 is discharged, sensors 30 to 40 that detect various states related to the engine system 100, and a powertrain control module (PCM) 50 that controls the entire engine system 100.

The intake passage 1 is provided with, in order from the upstream side, an air cleaner 3 that purifies the intake air introduced from the outside, a throttle valve 5 that adjusts the amount (intake air amount) of intake air that passes therethrough, and a surge tank 7 that temporarily stores the intake air to be supplied to the engine 10.

The engine 10 mainly includes an intake valve 12 that introduces, to the cylinder 11, the intake air supplied through the intake passage 1, the fuel injection valve 13 that injects fuel into the cylinder 11, a spark plug 14 that ignites an air-fuel mixture of the intake air and the fuel introduced to the cylinder 11, a piston 15 that reciprocates due to the combustion of the air-fuel mixture in the cylinder 11, a crankshaft 16 that is rotated by the reciprocal motion of the piston 15, and an exhaust valve 17 through which the exhaust gas generated by the combustion of the air-fuel mixture in the cylinder 11 is discharged to the exhaust passage 25. Although only one cylinder 11 of the engine 10 is illustrated in FIG. 2, the engine 10 actually has a plurality of cylinders 11 (for example, four cylinders).

In addition, the engine 10 is configured so that the operation timings (corresponding to the phases of the valves) of the intake valve 12 and the exhaust valve 17 can be changed by a variable intake valve mechanism 18 and a variable exhaust valve mechanism 19 as variable valve timing mechanisms. Although various known types can be applied as the variable intake valve mechanism 18 and the variable exhaust valve mechanism 19, the operation timings of the intake valve 12 and the exhaust valve 17 can be changed by, for example, an electromagnetic or hydraulic mechanism.

The exhaust passage 25 mainly has exhaust purification catalysts 26a and 26b having the function of purifying exhaust gas, such as, for example, NOx catalysts, three-way catalysts, and oxidation catalysts.

In addition, the engine system 100 is provided with the sensors 30 to 40 that detect various states about the engine system 100. These sensors 30 to 40 will be specifically described below. The accelerator position sensor 30 detects the accelerator opening, which corresponds to the opening of the accelerator pedal (equivalent to the amount depression of the accelerator pedal by the driver). The air flow sensor 31 detects the intake air amount corresponding to the flowrate of the intake air passing through the intake passage 1. The throttle opening sensor 32 detects the throttle opening, which is the opening of the throttle valve 5. The pressure sensor 33 detects the pressure of the intake manifold corresponding to the pressure of the intake air supplied to the engine 10. The crank angle sensor 34 detects the crank angle of the crankshaft 16. The water temperature sensor 35 detects the water temperature, which is the temperature of cooling water for cooling the engine 10. The temperature sensor 36 detects the in-cylinder temperature, which is the temperature inside the cylinder of the engine 10. The cam angle sensors 37 and 38 detect the operation timings including the valve closing timings of the intake valve 12 and the exhaust valve 17, respectively. The vehicle speed sensor 39 detects the speed (vehicle speed) of the vehicle 500. The transmission revolutions sensor 40 detects the number of revolutions of the transmission 204, that is, the number of revolutions of the clutch 202 (more specifically, the number of revolutions of the shaft (P shaft) of the shaft 201 close to the transmission 204). These various sensors 30 to 40 output detection signals S130 to S140 corresponding to detected parameters to the PCM 50, respectively.

The PCM 50 controls the components in the engine system 100 based on the detection signals S130 to S140 input from the various sensors 30 to 40 described above. Specifically, as illustrated in FIG. 3, the PCM 50 controls the opening and closing timing and the throttle opening of the throttle valve 5 by supplying a control signal S105 to the throttle valve 5, controls the fuel injection amount and fuel injection timing by supplying a control signal S113 to the fuel injection valve 13, controls the ignition timing by supplying a control signal S114 to the spark plug 14, and controls the operation timings of the intake valve 12 and the exhaust valve 17 by supplying control signals S118 and S119 to the variable intake valve mechanism 18 and the variable exhaust valve mechanism 19, respectively. It should be noted here that the throttle valve 5, the fuel injection valve 13, the spark plug 14, the variable intake valve mechanism 18, the variable exhaust valve mechanism 19, and the like correspond to the torque adjustment mechanisms in the present invention. In particular, the throttle valve 5 corresponds to the air amount adjustment device in the present invention and the fuel injection valve 13 corresponds to the fuel adjustment device in the present invention.

The PCM 50 described above includes one or more processors, various programs (including a basic control program such as an OS and application programs that are executed under the OS and realizes specific functions) that are interpreted and executed by the processors, and internal memories such as a ROM and a RAM in which programs and various types of data are stored. The PCM 50 corresponds to the controller in the present invention, which will be described in detail later.

<Details of Control>

Details of the control executed by the above PCM 50 in the embodiment will be described below.

(Overall Control)

Figure 4:
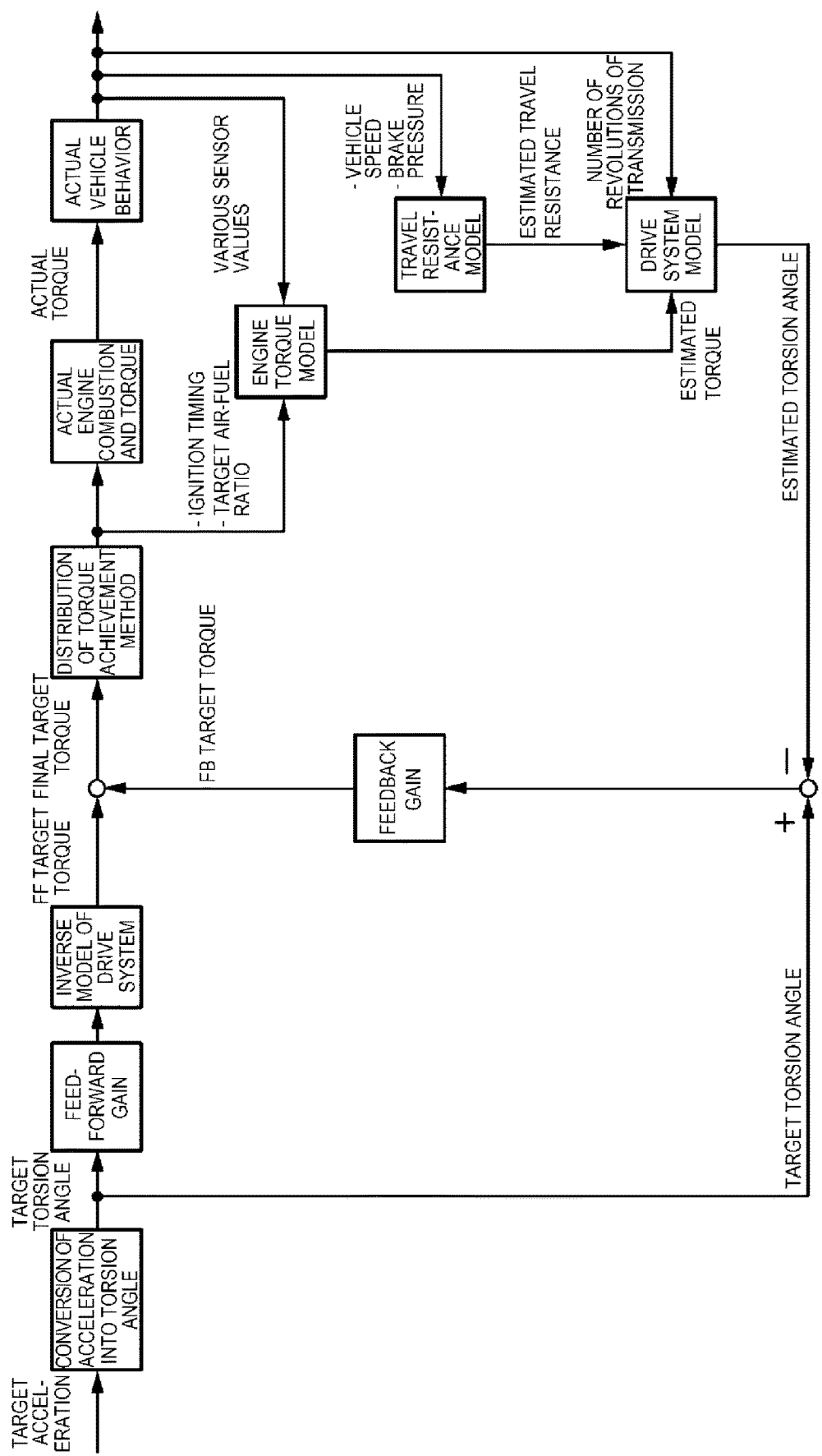
FIG. 4 is a block diagram illustrating overall control according to the embodiment of the present invention.
Figure 5:
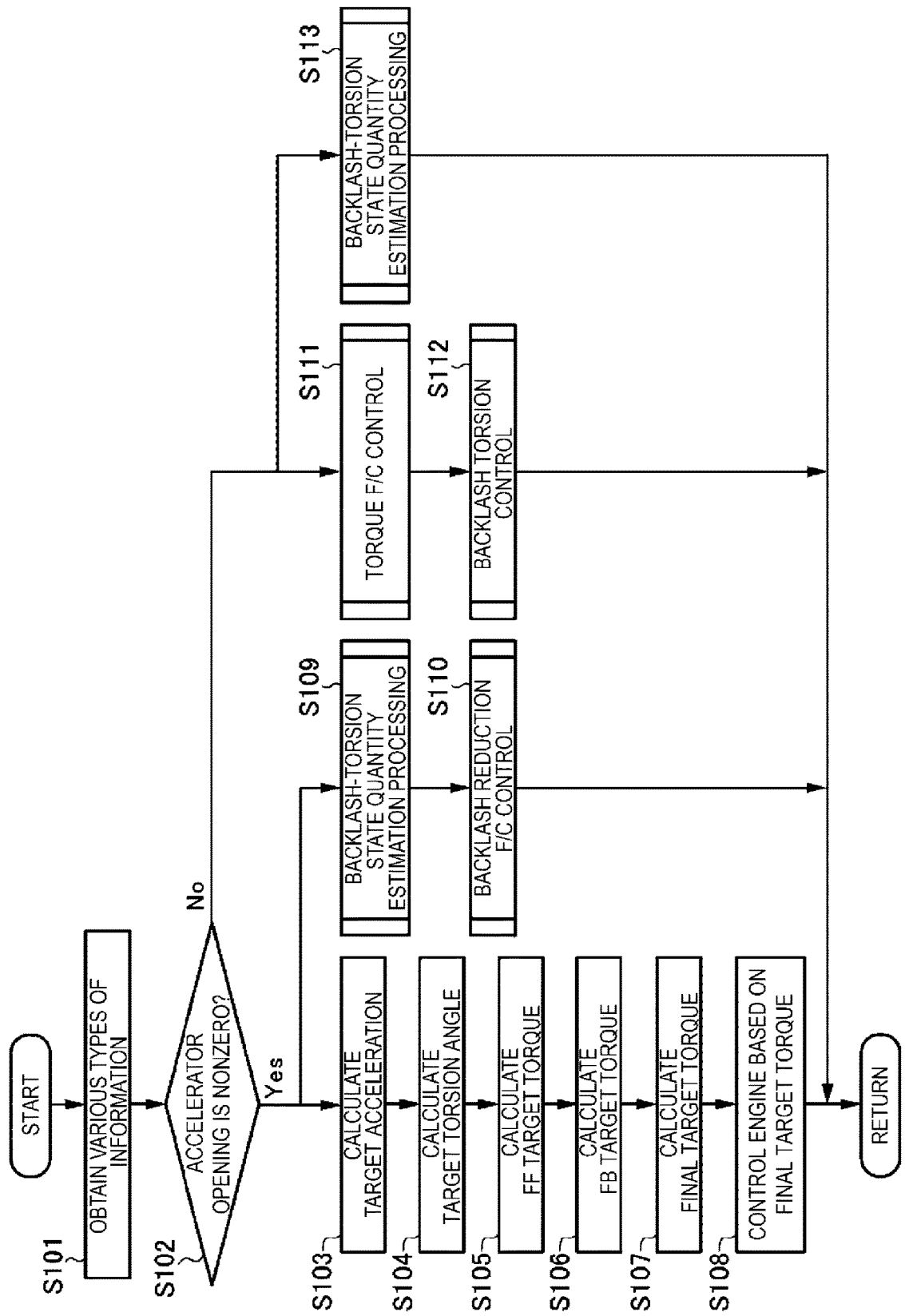
FIG. 5 is a flowchart illustrating the overall control according to the embodiment of present invention.

First, an overview of the overall control executed by the PCM 50 in the embodiment will be described with reference to FIGS. 4 and 5. FIG. 4 is a block diagram illustrating the overall control according to the embodiment of the present invention, and FIG. 5 is a flowchart illustrating the overall control according to the embodiment of present invention.

As illustrated in FIG. 4, the PCM 50 first sets the target acceleration based on the accelerator opening. For example, the PCM 50 sets the target acceleration corresponding to the current vehicle speed and accelerator opening by using a map indicating the relationship between the accelerator opening and the target acceleration, which is defined for each vehicle speed. Then, the PCM 50 converts this target acceleration into the target torsion angle of the drive shaft 209. Specifically, the PCM 50 converts the acceleration into the wheel torque using the following equation (1) and converts this wheel torque into the torsion angle using equation (2).

$$T_w = M_v \times r_w \times a \quad \text{equation (1)}$$

$$\theta = T_w / K_b \quad \text{equation (2)}$$

Here, "$T_w$" is the wheel torque, "$M_v$" is the vehicle weight, "$r_w$" is the wheel radius, "a" is the acceleration, and "$\theta$" is the torsion angle of the drive shaft, and "$K_b$" is the rigidity of the drive shaft.

Next, the PCM 50 applies a predetermined feedforward gain to the target torsion angle described above and calculates the target torque corresponding to the calculated target torsion angle. Specifically, the PCM 50 calculates the target torque to be output from the engine 10 to achieve the target torsion angle by using the inverse model of a predetermined drive system model concerning the vehicle 500. Since this target torque is calculated by feedforward processing, the target torque is referred to below as the "FF target torque" as appropriate.

Next, the PCM 50 corrects the target torque (referred to below as the "FB target torque" as appropriate) described above using the FF target torque calculated to control the torque of the engine 10 by feedback processing from the viewpoint of suppressing modeling error and disturbance (such as travel resistance). Then, the PCM 50 determines the target air amount, the target ignition timing, the target fuel injection amount, and the like (the target power generation amount of an alternator may be included) to output the target torque (referred to below as the "final target torque" as appropriate) corrected as described above from the engine 10, and controls the torque adjustment mechanisms such as the throttle valve 5, the fuel injection valve 13, and the spark plug 14 of the engine system 100. That is, the PCM 50 controls the engine 10 by distributing the method of achieving the final target torque. After that, combustion actually occurs in the engine 10, an actual torque is generated, and this actual torque appears as an actual vehicle behavior.

Next, by using a predetermined engine torque model, the PCM 50 estimates the torque generated at this time by the fuel of the engine 10 based on various parameters (such as the ignition timing and the target air-fuel ratio) used to control the engine 10 and various sensor values (such as the intake air amount by the air flow sensor 31, the intake manifold pressure by the pressure sensor 33, the engine revolutions by the crank angle sensor 34) corresponding to actual vehicle behavior caused by the fuel in the engine 10.

By using the predetermined travel resistance model together with the estimation of the torque described above, the PCM 50 estimates the travel resistance given to the vehicle 500 based on the vehicle speed detected by the vehicle speed sensor 39 and the brake pressure corresponding to the brake operation by the driver in parallel with the estimation of the torque described above. This travel resistance includes the braking force by the brake when the driver operates the brake in addition to the air resistance, the rolling resistance, and the gradient resistance.

Then, the PCM 50 estimates the actual torsion angle of the drive shaft 209 based on the torque and the travel resistance estimated as described above by using the predetermined drive system model concerning the vehicle 500. Specifically, the PCM 50 calculates the angular velocity (angular velocity of the inertia on the side of the engine 10) on the side of the engine 10 based on the estimated torque, calculates the angular velocity on the side of the wheels based on the estimated travel resistance, and estimates the torsion angle based on the difference between these angular velocities. In this case, the PCM 50 estimates the torsion angle by also using the number of revolutions of the clutch 202 (the number of revolutions of the P shaft) detected by the transmission revolutions sensor 40. Specifically, the PCM 50 corrects the angular velocity (corresponding to the estimated number of engine revolutions) on the side of the engine 10 calculated from the torque as described above, based on the number of revolutions of the clutch 202 (corresponding to the actual number of engine revolutions) to suppress modeling error. It should be noted here that the angular velocity on the side of the engine 10 is referred to below as the number of engine revolutions as appropriate.

Next, the PCM 50 calculates the FB target torque described above based on the torsion angle (estimated torsion angle) estimated as described above and the target torsion angle set initially. Specifically, the PCM 50 calculates the FB target torque by applying a predetermined feedback gain to the value obtained by subtracting the estimated torsion angle from the target torsion angle. Then, the PCM 50 calculates the final target torque by correcting the FF target torque described above using this FB target torque (typically, adding the FB target torque to the FF target torque).

Next, an overview of a flow of the overall control according to the embodiment of the present invention will be described with reference to FIG. 5. The processing concerning the flowchart illustrated in FIG. 5 is started when the ignition of the vehicle 500 is turned on and the PCM 50 and the like are powered on and is repeatedly executed in a predetermined cycle (for example, 50 ms).

First, in step S101, the PCM 50 obtains various types of information about the vehicle 500. Specifically, the PCM 50 obtains the parameters detected by the various sensors 30 to 40 described above.

Next, in step S102, the PCM 50 determines whether the accelerator opening detected by the accelerator position sensor 30 is nonzero. That is, the PCM 50 determines whether the accelerator pedal is depressed by the driver. As a result, when the accelerator opening is nonzero (Yes in step S102), the PCM 50 proceeds to steps S103 and S109. The processing from step S103 (the processing of steps S103 to S108) and the processing from step S109 (the processing of steps S109 and S110) are executed in parallel.

The details of the processing from steps S103 to S108 are as described in FIG. 4. That is, in step S103, the PCM 50 first calculates the target acceleration based on the accelerator opening detected by the accelerator position sensor 30. Next, in step S104, the PCM 50 calculates the target torsion angle corresponding to this target acceleration. Next, in step S105, the PCM 50 calculates the FF target torque to be output from the engine 10 to achieve this target torsion angle. Next, in step S106, the PCM 50 calculates the FB target torque for correcting this FF target torque (strictly, the PCM 50 calculates the FB target torque in parallel with the calculation of the FF target torque). Next, in step S107, the PCM 50 calculates the final target torque by correcting the FF target torque using the FB target torque. Next, in step S108, the PCM 50 controls the engine 10 based on this final target torque.

On the other hand, in step S109, the PCM 50 executes backlash-torsion state quantity estimation processing for estimating the backlash state of the gear in the power transmission system 207 and the torsion state of the drive shaft 209. The PCM 50 uses the result of this backlash-torsion state quantity estimation processing in calculating the FB target torque in step S106 described above. In particular, the PCM 50 applies the result of backlash-torsion state quantity estimation processing in estimating the actual torsion angle of the drive shaft 209.

Next, in step S110, the PCM 50 executes backlash reduction fuel-cut (F/C) control to stop the fuel supply to the engine 10 when backlash is reduced based on the result of the backlash-torsion state quantity estimation processing in step S109 to suppress body vibrations (referred to below as a "backlash reduction shock" as appropriate) that occur when the backlash of the gear in the power transmission system 207 is reduced.

In contrast, when the accelerator opening is zero in step S102 (No in step S102), that is, when the accelerator pedal is not depressed by the driver, the PCM 50 proceeds to steps S111 and S113. The processing from step S111 (the processing of steps S111 and S112) and the processing of step S113 are executed in parallel.

In step S113, the PCM 50 executes backlash-torsion state quantity estimation processing as in step S109 described above. On the other hand, in step S111, since the accelerator opening is zero (accelerator off), the PCM 50 executes torque F/C control for stopping (fuel cutting) the fuel supply to the engine 10. Next, in step S112, the PCM 50 executes, based on the result of the backlash-torsion state quantity estimation processing in step S113, backlash torsion control for suppressing body vibrations caused by the torsion of the drive shaft 209 caused when the backlash of the gear in the power transmission system 207 is reduced.

(Setting the Target Torque)

Next, the method of setting the target torque in the embodiment will be specifically described with reference to FIGS. 6 to 8.

Figure 6:
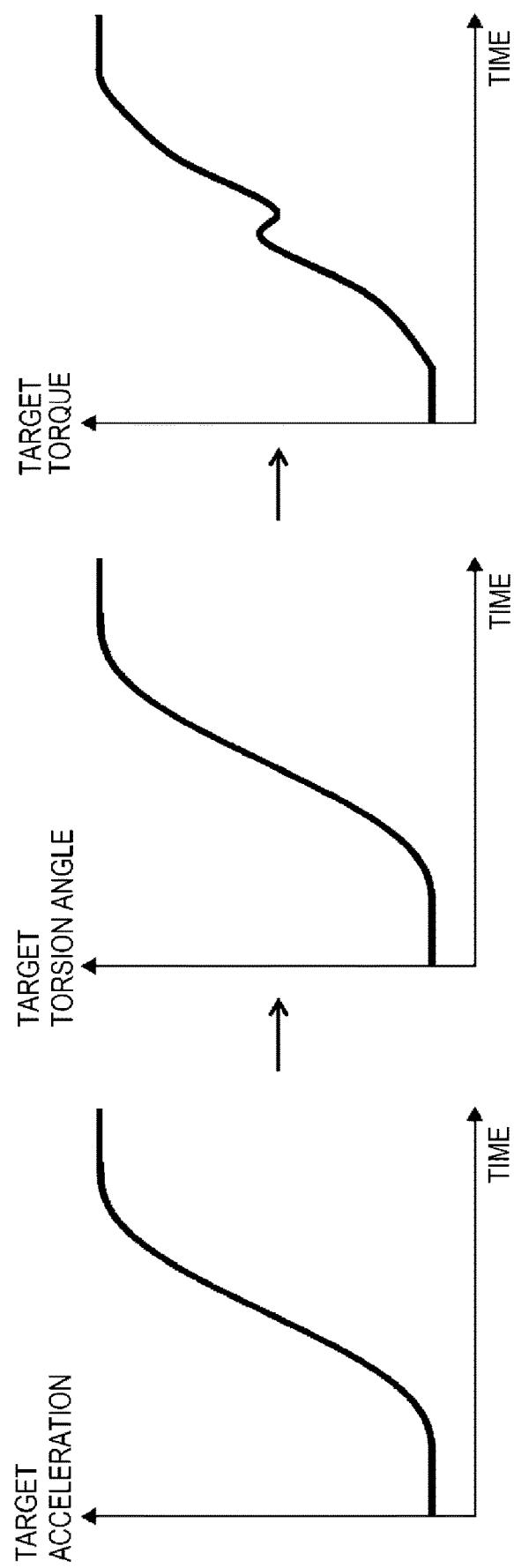
FIG. 6 is an explanatory diagram schematically illustrating a flow until a target torque is set from a target acceleration in the embodiment of the present invention.

FIG. 6 is an explanatory diagram schematically illustrating a flow until the target torque is set from the target acceleration in the embodiment of the present invention. First, the PCM 50 sets the target acceleration based on the accelerator opening detected by the accelerator position sensor 30. For example, the PCM 50 sets the target acceleration corresponding to the current vehicle speed and accelerator opening by using the map representing the relationship between the accelerator opening and the target acceleration, which is defined for each vehicle speed.

Next, the PCM 50 converts the target acceleration into the target torsion angle of the drive shaft 209. Specifically, the PCM 50 converts the target acceleration into the wheel torque and then converts the wheel torque into the target torsion angle by using the above equations (1) and (2), respectively. Basically, the form of temporal changes of the target torsion angle is similar to the form temporal changes of the target acceleration. Next, the PCM 50 calculates the target torque to be output from the engine 10 to achieve the target torsion angle by using the inverse model of the predetermined drive system model concerning the vehicle 500 (the target torque calculated here is the FF target torque described above). In the embodiment, the form of temporal changes of the target torque is partially different from the form of temporal changes of the target torsion angle.

Figure 7:
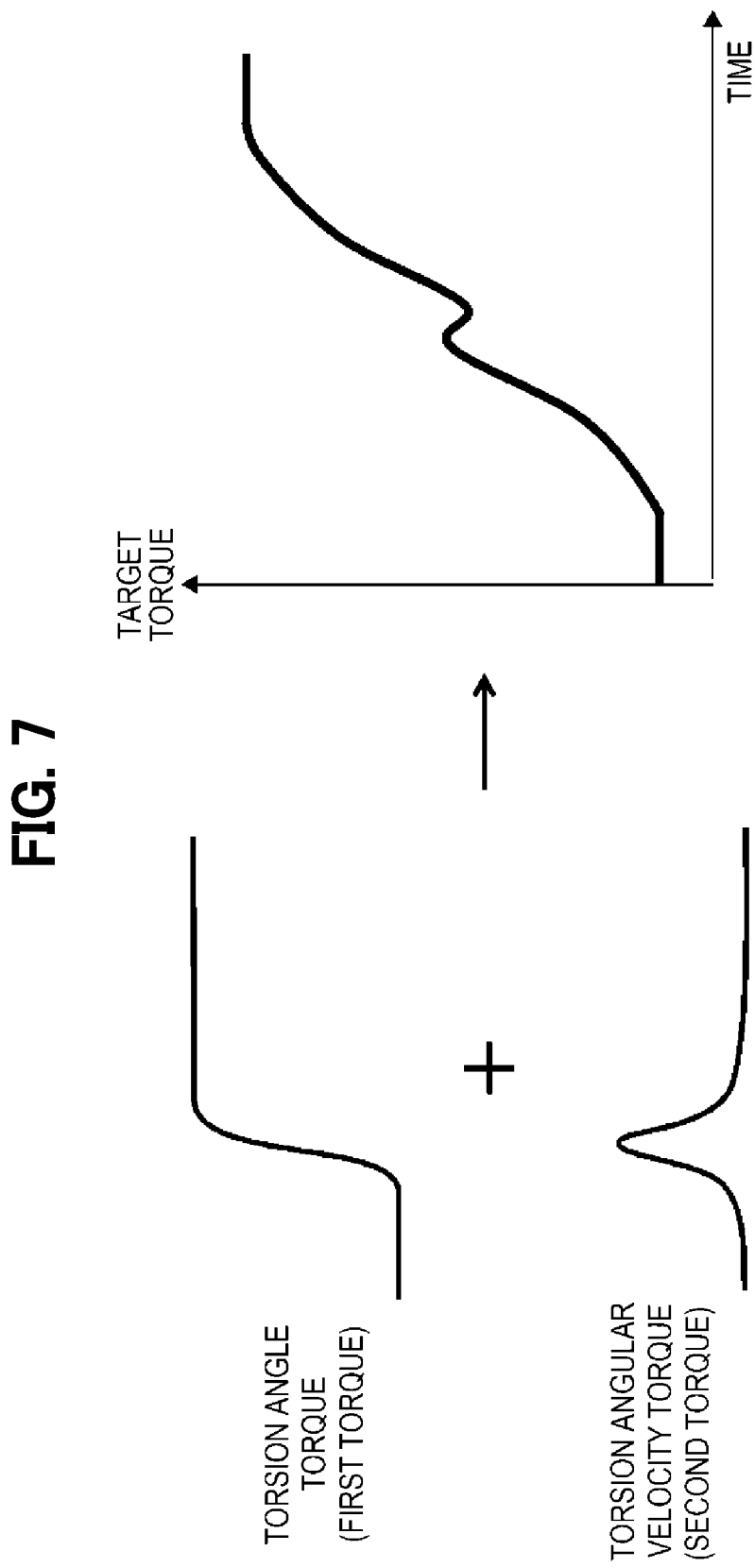
FIG. 7 is an explanatory diagram specifically illustrating the method for setting the target torque in the embodiment of the present invention.

Next, FIG. 7 is an explanatory diagram specifically illustrating the method for setting the target torque in the embodiment of the present invention. As illustrated in FIG. 7, when briefly described, the PCM 50 sets the target torque based on the torsion angle torque (first torque) according to the torsion angle (target torsion angle) of the drive shaft 209 and the torsion angular velocity torque (second torque) according to the torsion angular velocity (obtained by differentiating the target torsion angle) of the drive shaft 209. Specifically, the PCM 50 sets the target torque by adding these torques. As a result, the target torque increases according to the torsion angle torque as a whole, but the target torque has a time waveform including a temporary drop according to the torsion angular velocity torque in this increasing process.

The shape of the target torque described above corresponds to the behavior of the drive shaft 209 in which the torsion of the drive shaft 209 stops once because energy is stored in the drive shaft 209 once while the torque increases when the torque is being applied to the drive shaft 209, and then the torsion of the drive shaft 209 advances because the energy in the drive shaft 209 is released. In the embodiment, the target torque that considers the behavior of the drive shaft 209 when such a torque is given is applied by using the inverse model of the drive system model.

More specifically, the PCM 50 calculates the target torque using the following equation (3) representing the inverse model of the drive system model.

$$T_e = \eta J_e \ddot{\theta} + \left(\frac{c}{\eta} + \frac{\eta J_e}{J_v}c\right)\dot{\theta} + \left(\frac{k}{\eta} + \frac{\eta J_e}{J_v}k\right)\theta + \frac{\eta J_e}{J_v}T_v \quad \text{equation (3)}$$

In equation (3), "$T_e$" is the engine torque (target torque), "$T_v$" is the travel resistance torque, and "θ" is the torsion angle of the drive shaft (dots above θ represent the torsion angular velocity obtained by differentiating the torsion angle once and the torsion angular acceleration obtained by differentiating the torsion angle twice), "η" is the gear ratio, and "$J_e$" is the inertia of the engine, "$J_v$" is the inertia of the vehicle body, "k" is the stiffness of the drive shaft, and "c" is the damping of the drive shaft. In addition, in equation (3), the third term on the right side corresponds to the torsion angle torque according to the torsion angle and the second term on the right side corresponds to the torsion angular velocity torque according to the torsion angular velocity. Basically, in equation (3), the terms of the torsion angle torque and the torsion angular velocity torque are dominant, so the target torque has a time waveform corresponding to the torsion angle torque and the torsion angular velocity torque as illustrated in FIG. 7.

The above equation (3) is defined by the following concept. That is, in the embodiment, the target torque is set based on the target torsion angle so as to secure the transient response during acceleration or deceleration while suppressing the body vibrations due to the torsion of the drive shaft 209. In particular, the torsion speed needs to be kept at a predetermined value or less to suppress vibrations due to the torsion of the drive shaft 209, that is, to keep the torsion angle at the predetermined value or less. To achieve this, the torsion angular acceleration needs to be kept at a predetermined value or less. Since this torsion angular acceleration is defined by "the torque multiplied by the inertia," the swing width of the torque needs to be kept at a certain value or less. By further adding the securing of the transient response to such concept, equation (3) for calculating the ideal engine torque is defined.

Figure 8:
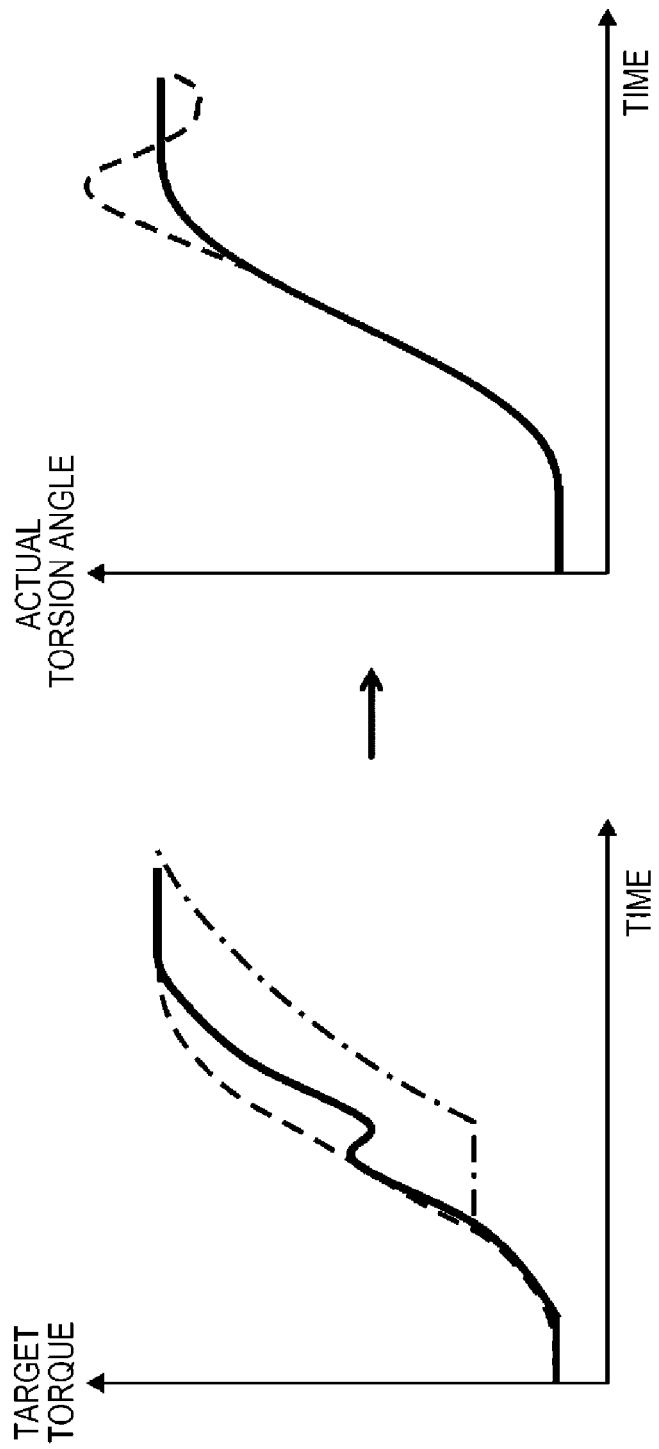
FIG. 8 is an explanatory diagram specifically illustrating the actual torsion angle when the target torque according to the embodiment of the present invention has been applied.

Next, FIG. 8 is an explanatory diagram specifically illustrating the actual torsion angle when the target torque according to the embodiment of the present invention has been applied. In FIG. 8, the solid lines indicate the target torque and the actual torsion angle according to the embodiment and the dotted lines indicate the target torque and the actual torsion angle according to comparative example 1. In the embodiment, the target torque having a time waveform including a temporary drop of the torque in the increasing process of the torque is applied. This target torque considers the actual behavior of the drive shaft 209 when the torque is applied. Application of such a target torque appropriately generates the actual torsion angle corresponding to the target torsion angle (see FIG. 6). In particular, since the torsion of the drive shaft 209 is smooth in the embodiment, vibrations caused by the torsion of the drive shaft 209 are suppressed.

In contrast, the target torque having a form similar to that of the target torsion angle (see FIG. 6) is applied in comparative example 1. That is, in comparative example 1, the target torque having a time waveform that increases without reducing in the middle is applied. This means that the drive shaft 209 is treated as a rigid body without considering the torsion of the drive shaft 209. Application of such a target torque causes the actual torsion angle to overshoot. This is because the torque applied is too large. As a result, vibrations caused by the torsion of the drive shaft 209 occur in comparative example 1.

Conventionally, the target torque as indicated by the dot-dash line in FIG. 8 is applied to suppress the occurrence of vibrations as in comparative example 1 (referred to below as "comparative example 2"). Specifically, the target torque with a rise delayed to some extent is applied in comparative example 2. Since the torsion of the actual torsion angle is light (not illustrated) in the target torque described above, vibrations caused by the torsion of the drive shaft 209 can be suppressed. However, the response (transient response) during acceleration or deceleration is reduced. In contrast, since the target torque considering the actual behavior of the drive shaft 209 during application of the torque is applied without delaying the rise of the target torque in the embodiment, it is possible to appropriately balance the securing of a transient response and the suppression of body vibrations.

It should be noted here that the target torque set as described above may be corrected in consideration of the response delay of the torque adjustment mechanism that adjusts the torque of the engine 10. Specifically, the PCM 50 preferably corrects the target torque so as to compensate for the response delay of the throttle valve 5 (air amount adjustment device) that adjusts the amount of air supplied to the engine 10.

Figure 9:
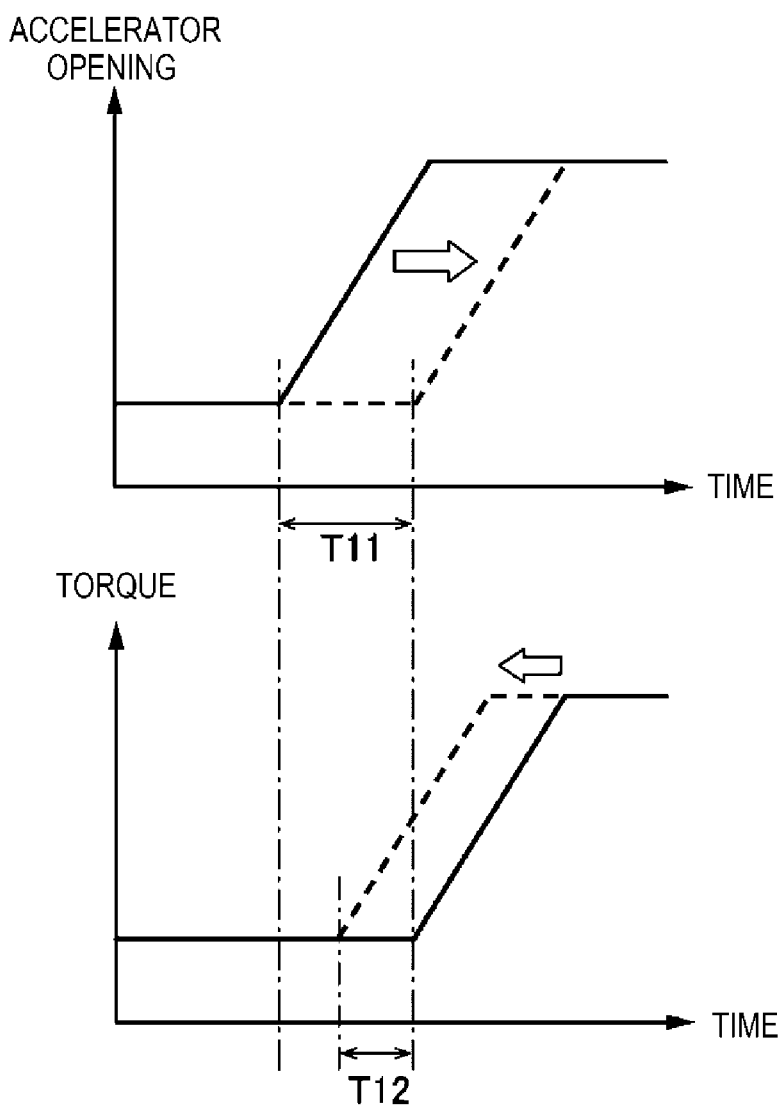
FIG. 9 is an explanatory diagram illustrating the correction of the target torque according to the embodiment of present invention.

FIG. 9 is an explanatory diagram illustrating the correction of the target torque according to the embodiment of present invention described above. The graph in the upper portion in FIG. 9 illustrates the accelerator opening (solid line) according to the accelerator operation by the driver and the acceleration (dotted line) to be generated from the vehicle 500 according to this accelerator opening. As illustrated in this graph, when the acceleration is generated after an appropriate time T11 (for example, approximately 150 msec) after the accelerator operation by the driver, the driver tends to feel that the vehicle 500 is appropriately accelerating according to the accelerator operation.

The graph in the lower portion in FIG. 9 illustrates the actual torque (solid line) of the engine 10 required to cause the vehicle 500 to generate the acceleration described above and the target torque (dotted line) to be applied to achieve this actual torque. When the torque of the engine 10 is increased according to the accelerator operation, control is made to increase the opening of the throttle valve 5 so as to increase the amount of air supplied to the engine 10. There is a time delay from when such a control command is issued to when the torque is actually changed. This time delay corresponds to the response delay of throttle valve 5 and the like.

Accordingly, in the embodiment, the PCM 50 applies, as the target torque, the torque obtained by advancing the actual torque to be output from the engine 10 by time T12 (for example, approximately 100 msec) corresponding to such a response delay so as to advance the control command for the throttle valve 5 by time T12. That is, the PCM 50 performs correction that advances the target torque set based on the target torsion angle as described above, by time t12 corresponding to the response delay of the throttle valve 5. This can appropriately suppress the delay of the torque output of the engine 10 due to the response delay of the throttle valve 5 with respect to the driver's acceleration request. Although the correction of the target torque during acceleration is illustrated in FIG. 9, such correction of the target torque can also be applied similarly during deceleration.

(Backlash-Torsion State Quantity Estimation Processing).

Next, the backlash-torsion state quantity estimation processing performed in steps S109 and S113 in the FIG. 5 will be specifically described. As described above, this backlash-torsion state quantity estimation processing is performed to estimate the backlash state of the gear (such as a differential gear, final gear) in the power transmission system 207 and the torsion state of the drive shaft 209.

Figure 10:
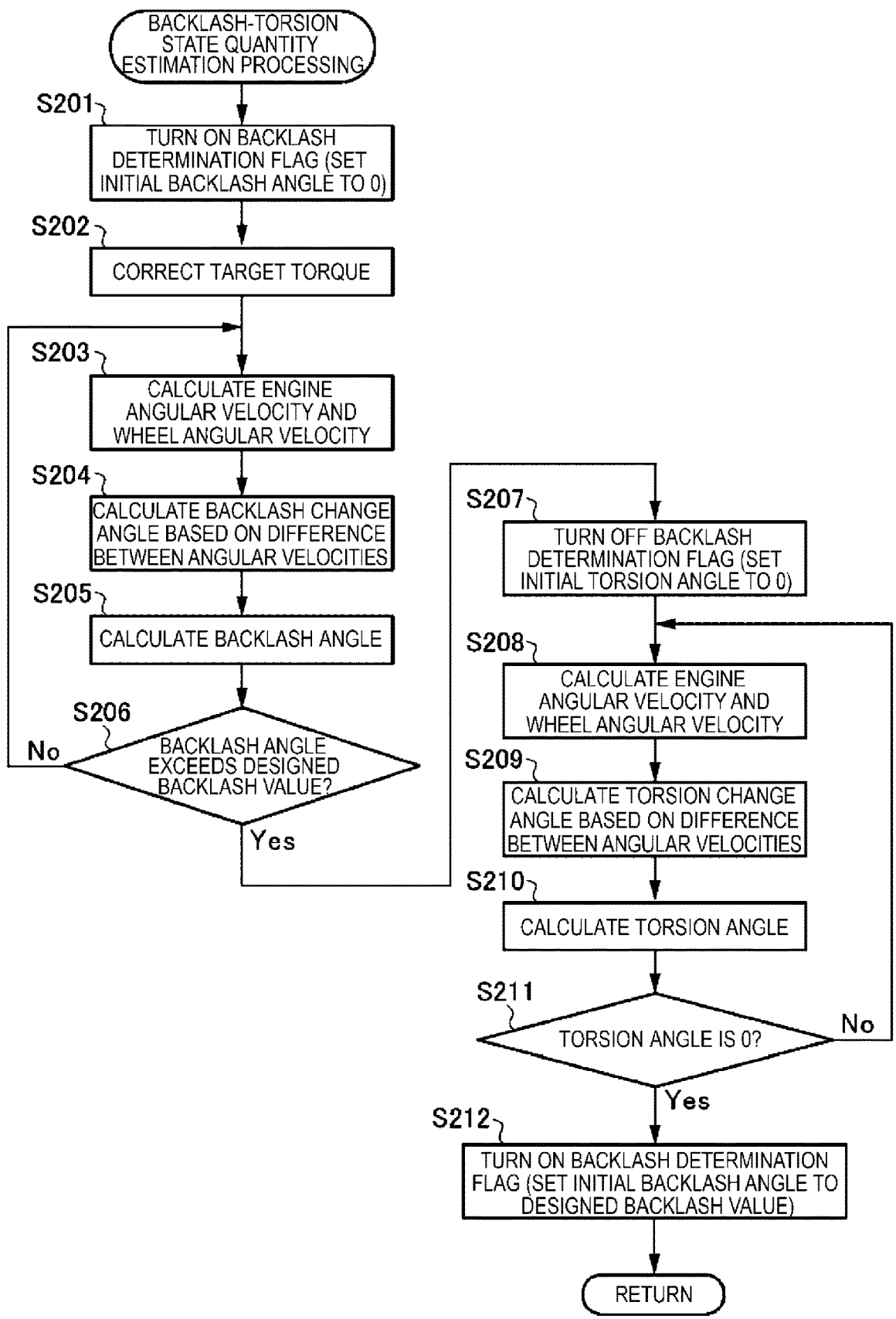
FIG. 10 is a flowchart illustrating backlash-torsion state quantity estimation processing according to the embodiment of the present invention.

FIG. 10 is a flowchart illustrating backlash-torsion state quantity estimation processing according to the embodiment of the present invention. Typically, this processing is started when the vehicle 500 starts from the stop state. The relationship between the backlash of the gear and the torsion of the drive shaft 209 is as follows. That is, the drive shaft 209 does not have torsion when the backlash is present in the gear and, when the drive shaft 209 has torsion, the backlash is not present (backlash is reduced) in the gear. Accordingly, in the backlash-torsion state quantity estimation processing according to the embodiment, the processing (steps S201 to S206 and S212) for estimating the backlash state of the gear and the processing (steps S207 to S211) for estimating the torsion state of drive shaft 209 are switched and executed.

When the backlash-torsion state quantity estimation processing is started, in step S201, the PCM 50 first turns on a "backlash determination flag" that indicates the presence or absence of backlash in the gear of the power transmission system 207. Since backlash exists (that is, backlash is not reduced) in the situation in which step S201 is executed (for example, during starting from the stop state), the PCM 50 turns on the backlash determination flag. In addition, the PCM 50 sets the initial backlash angle, which indicates the initial position of the backlash of the gear, to zero.

Next, in step S202, the PCM 50 corrects the target torque of the engine 10. Specifically, the PCM 50 corrects the target torque so as to quickly complete the backlash reduction of the gear (corresponding to reduction of the time from when the torsion angle becomes zero to when the torsion angle changes to a value (>0) in the drive direction or a value (<0) in the deceleration direction when viewed from the drive shaft 209). In particular, the PCM 50 corrects the target torque in the increasing direction when the target torque is changing in the increasing direction or corrects the target torque in the reducing direction when the target torque is changing in the reducing direction. For example, the PCM 50 increases the target torque by a preset certain amount when the target torque is changing in the increasing direction or reduces the target torque by a preset certain amount when the target torque is changing in the reducing direction.

Next, in step S203, the PCM 50 estimates the torque of the engine 10 using a predetermined engine torque model and calculates the angular velocity (angular velocity of the inertia on the side of the engine 10) on the side of the engine 10 based on this torque, and estimates the travel resistance using a predetermined travel resistance model and calculates the angular velocity on the side of the wheels. In this case, the PCM 50 may correct the angular velocity on the side of the engine 10 using the number of revolutions of the clutch 202 (number of revolutions of the P shaft) detected by the transmission revolutions sensor 40.

Next, in step S204, the PCM 50 calculates the backlash change angle of the gear based on the difference between the angular velocity on the side of the engine 10 and the angular velocity on the side of the wheels calculated in step S203. The backlash change angle calculated by the PCM 50 becomes larger as the difference between the angular velocities is larger.

Next, in step S205, the PCM 50 calculates the current backlash angle based on the backlash change angle calculated in step S204. Specifically, the PCM 50 calculates the current backlash angle by adding the backlash change angle to the backlash angle calculated last time.

Next, in step S206, the PCM 50 determines whether the backlash angle calculated in step S205 exceeds a designed backlash value. This designed backlash value (for example, approximately three degrees) corresponds to the backlash angle of the gear for which the backlash is reduced. Accordingly, the determination in step S206 corresponds to the determination as to whether the backlash has been reduced. When it is not determined that the backlash angle exceeds the designed backlash value in this step S206 (No in step S206), that is, when the backlash has not been reduced, the PCM 50 returns to step S203 and executes the processing from step S203 again.

In contrast, when it is determined that the backlash angle exceeds the designed backlash value in this step S206 (Yes in step S206), that is, when the backlash has been reduced, the PCM 50 proceeds to step S207. In this case, the PCM 50 turns off the backlash determination flag (step S207). In addition, since the drive shaft 209 does not have torsion at the time the backlash has been reduced, the PCM 50 sets the initial torsion angle, which indicates the initial torsion angle of the drive shaft 209, to zero in step S207.

Next, in step S208, the PCM 50 estimates the torque of the engine 10 using the predetermined engine torque model, calculates the angular velocity on the side of the engine 10 (the angular velocity of the inertia on the side of the engine 10) based on this torque, estimates the travel resistance using a predetermined travel resistance model, and calculates the angular velocity on the side of the wheels based on this travel resistance. In this case, the PCM 50 may correct the angular velocity on the side of the engine 10 by using the number of revolutions of the clutch 202 (the number of revolutions of the P axis) detected by the transmission revolutions sensor 40.

Next, in step S209, the PCM 50 calculates the torsion change angle of the drive shaft 209 based on the difference between the angular velocity on the side of the engine 10 and the angular velocity on the side of the wheels calculated in step S208. The torsion change angle calculated by the PCM 50 becomes larger as the difference between the angular velocities is larger.

Next, in step S210, the PCM 50 calculates the current torsion angle based on the torsion change angle calculated in step S209. Specifically, the PCM 50 calculates the current torsion angle by adding the torsion change angle to the torsion angle calculated last time.

Next, in step S211, the PCM 50 determines whether the torsion angle calculated in step S210 is zero, that is, whether the drive shaft 209 does not have torsion. When it is not determined that the torsion angle is zero in step S211 (No in step S211), that is, when the drive shaft 209 has torsion, the PCM 50 returns to step S208 and executes the processing from step S208 again.

In contrast, when it is determined that the torsion angle is zero in step S211 (Yes in step S211), that is, when the drive shaft 209 does not have torsion, the PCM 50 proceeds to step S212. In this case, the PCM 50 turns on the backlash determination flag (step S212). That is, since the backlash reduction of the gear is started after that, the PCM 50 switches the backlash determination flag from off to on. In addition, since the backlash is still reduced at the time the torsion angle becomes zero, the PCM 50 sets the initial backlash angle to the designed backlash value described above in step S212. It should be noted here that the designed backlash value on the acceleration side (drive side) is a positive value and the designed backlash value on the deceleration side is a negative value.

After step S212, the PCM 50 ends the backlash-torsion state quantity estimation processing and returns to main routine (FIG. 5).

Figure 11:
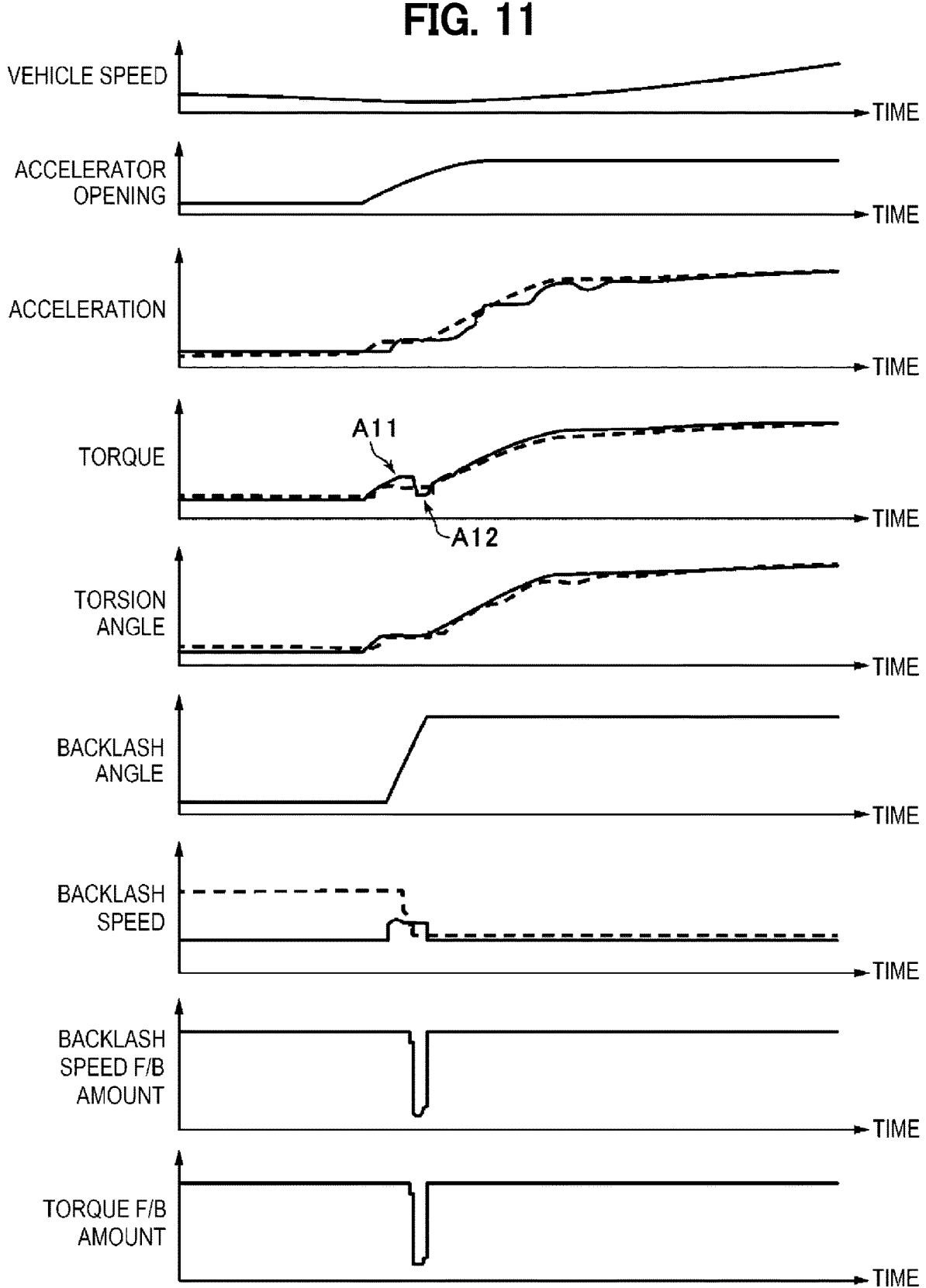
FIG. 11 is a time chart for describing the operation and effect when the target torque is corrected so as to quickly complete backlash reduction in the embodiment of the present invention.

Next, the operation and effect when the target torque is corrected so as to quickly complete backlash reduction in the embodiment (see step S202 in FIG. 10) will be described with reference to FIG. 11. FIG. 11 is a time chart illustrating, in order from the top, the vehicle speed, the accelerator opening, the acceleration (the solid line represents the actual acceleration and the dotted line represents target acceleration), the torque (the solid line represents the target torque and the dotted line represents the actual torque), the torsion angle (the solid line represents the target torsion angle and the dotted line represents the estimated torsion angle), the backlash angle (the estimated backlash angle) of the gear, the backlash speed (the solid line represents the estimated backlash speed and the dotted line represents the target backlash speed), the backlash speed F/B amount, and the torque F/B amount. It is assumed that the vehicle 500 accelerates in FIG. 11.

As illustrated in FIG. 11, when the backlash angle starts changing due to the acceleration of vehicle 500, that is, when the backlash reduction of the gear starts (the torsion angle of the drive shaft 209 becomes zero at this time), the PCM 50 corrects the target torque so as to quickly complete the backlash reduction of the gear. In the situation illustrated in FIG. 11, since the target torque changes in the increasing direction, the PCM 50 corrects the target torque in the increasing direction (see arrow A11).

Then, the PCM 50 determines the target torque in the following procedure while reducing the backlash of the gear. That is, the PCM 50 estimates the speed at which the backlash of the gear is reduced (estimated backlash speed) and sets the target backlash speed based on this estimation result. Then, the PCM 50 sets the backlash speed F/B amount for controlling the backlash speed based on the difference between the target backlash speed and the estimated backlash speed and applies the torque F/B amount according to this backlash speed F/B amount to the target torque. This temporarily reduces the target torque at the timing of completion of the backlash reduction of the gear (see arrow A12). As a result, it is possible to suppress vibrations (backlash reduction shock) that occur when backlash reduction is completed.

(Backlash Reduction F/C Control)

Next, the backlash reduction F/C control performed in step S110 in FIG. 5 will be specifically described. As this backlash reduction F/C control, the PCM 50 stops (F/C) the fuel supply to the engine 10 to suppress body vibrations (backlash reduction shock) that occur when the backlash of the gear in the power transmission system 207 is reduced. In particular, a backlash reduction shock tends to become large because the PCM 50 corrects the target torque so as to quickly complete the backlash reduction of the gear as described above in the embodiment, so the PCM 50 reduces the torque by executing backlash reduction F/C control to appropriately suppress this backlash reduction shock. As the method of achieving torque reduction for suppressing the backlash reduction shock, the method of retarding the ignition timing may be adopted other than F/C, but the desired torque reduction is not probably achieved by the retarding of the ignition timing due to the combustion limit of the engine 10. Accordingly, the embodiment adopts F/C as the method of achieving the torque reduction for suppressing the backlash reduction shock.

Figure 12:
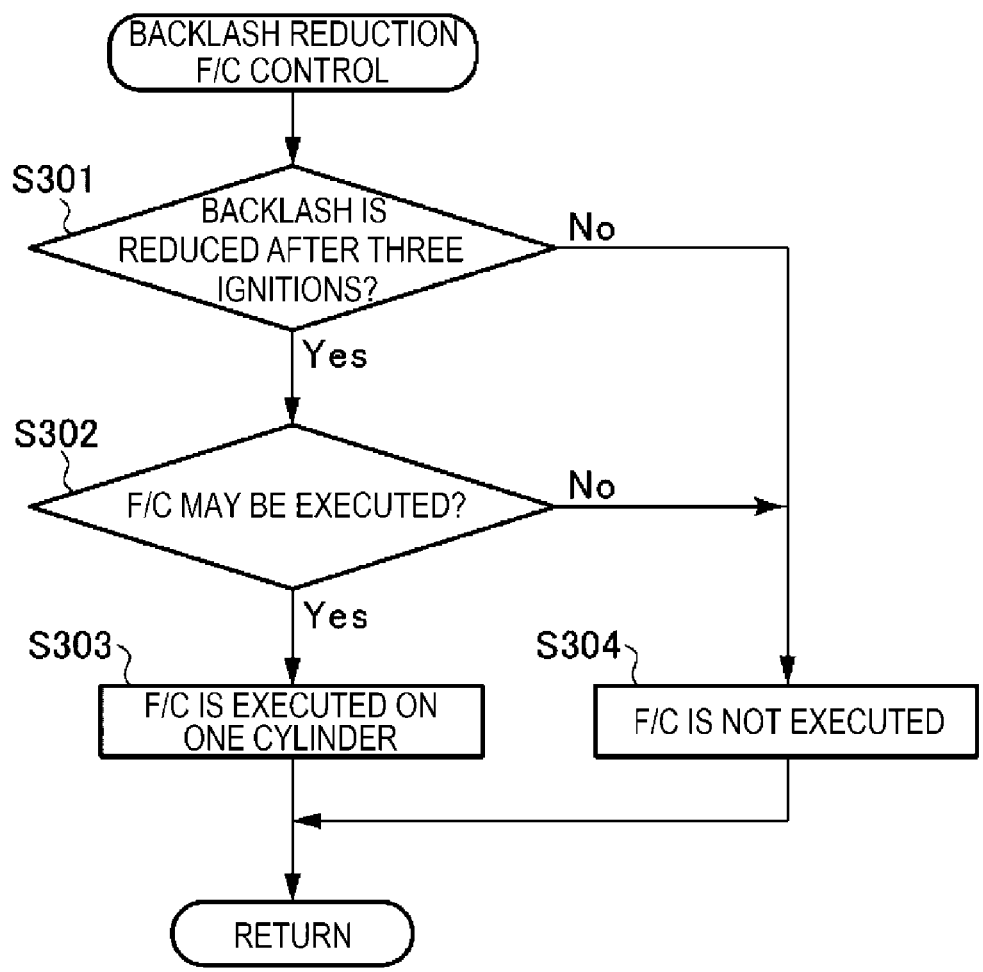
FIG. 12 is a flowchart illustrating backlash reduction F/C control according to the embodiment of the present invention.

FIG. 12 is a flowchart illustrating backlash reduction F/C control according to the embodiment of the present invention. Typically, this backlash reduction F/C control is performed during acceleration of the vehicle 500.

When backlash reduction F/C control is started, in step S301, the PCM 50 first determines whether the backlash of the gear is reduced after three ignitions (360degCA) of the engine 10 based on the result of the backlash-torsion state quantity estimation processing described above. Specifically, the PCM 50 sets the time (referred to below as the "backlash reduction time") required from the start (backlash start) of backlash reduction of the gear to the completion of backlash reduction based on the backlash-torsion state quantity estimation processing, and sets the timer corresponding to the backlash reduction time at the start of backlash reduction to perform countdown. Then, the PCM 50 determines whether the timing three ignitions before the timing (backlash reduction completion timing) at which the countdown of the timer ends is reached. The reason for determining the timing three ignitions before the completion of backlash reduction is that the time required from when a F/C command for suppressing a backlash reduction shock is issued to when the F/C is actually performed in the engine 10 is approximately the time corresponding to three ignitions.

When it is determined that the backlash of the gear is reduced after three ignitions in step S301 (Yes in step S301), the PCM 50 proceeds to step S302 and determines whether the F/C of the engine 10 may be executed. Specifically, the PCM 50 determines whether the F/C may be executed based on the following four conditions: (i) a load is applied, that is, the clutch 202 is connected, (ii) the vehicle speed is equal to or more than a predetermined speed (approximately 1 to 2 km/h), (iii) no F/C is executed after the turn-on of the accelerator, and (iv) the engine 10 is not in cylinder idle operation. That is, the PCM 50 determines that the F/C may be executed when all the four conditions (i) to (iv) are met and does not determine that the F/C may be executed when at least one of the four conditions (i) to (iv) is not met. The condition (iii) no F/C is executed after turn-on of the accelerator is adopted to suppress the occurrence of a shock because the F/C is executed many times by repeatedly depressing and releasing the accelerator pedal.

When it is determined that the F/C may be executed in step S302 (Yes in step S302), the PCM 50 proceeds to step S303 and executes the F/C on one cylinder 11 of the engine 10. Specifically, the PCM 50 controls the fuel injection valve 13 so as to stop the fuel supply to the cylinder 11 in which combustion occurs next of all the cylinders 11. This temporarily reduces the torque of the engine 10 when the backlash of the gear is reduced, thereby suppressing a backlash reduction shock.

In contrast, when it is not determined that the backlash of the gear is reduced after three ignitions (No in step S301) and when it is not determined that the F/C may be executed (No in step S302), the PCM 50 proceeds to step S304. In this case, the PCM 50 does not execute the F/C on the engine 10 (step S304).

After step S303 and step S304, the PCM 50 ends the backlash reduction F/C control and returns to the main routine (FIG. 5).

Figure 13:
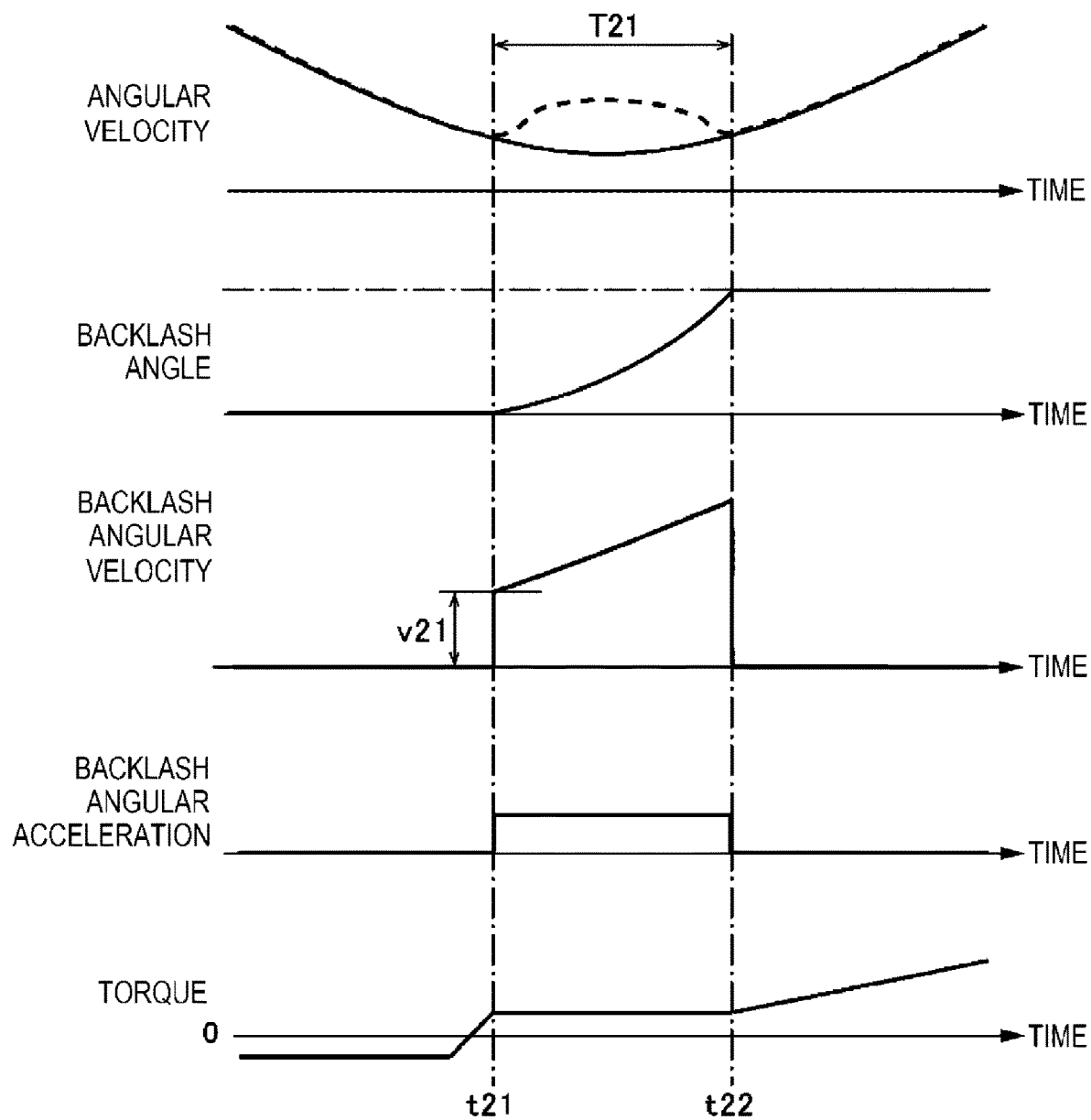
FIG. 13 is an explanatory diagram about how to calculate backlash reduction time according to the embodiment of the present invention.

Next, how to calculate the backlash reduction time will be described with reference to FIG. 13. FIG. 13 is a time chart illustrating, in order from the top, the angular velocity (the solid line represents the angular velocity of the wheels and the dotted line represents the angular velocity of the engine 10), the backlash angle, the backlash angular velocity, the backlash angular acceleration, and the torque of the engine 10.

In the example illustrated in FIG. 13, the angular velocity of the engine 10 deviates from the angular velocity of the wheels at time t21 (specifically, the angular velocity of the engine 10 becomes larger than the angular velocity of the wheels due to acceleration). At time t21, the backlash reduction of the gear starts. When backlash reduction starts in this way, the PCM 50 calculates the backlash reduction time in the following procedure. The backlash angle is obtained by integrating the backlash speed, the backlash speed is obtained by integrating the backlash acceleration, and the backlash acceleration corresponds to the torque and the travel resistance of the engine 10. Accordingly, the PCM 50 calculates the backlash acceleration based on the torque and the travel resistance of the engine 10, calculates the backlash speed based on this backlash acceleration (the initial speed v21 is given to the backlash speed based on the speed of the flywheel on the side of the engine 10), and calculates the backlash angle based on this backlash speed. Then, the PCM 50 calculates the backlash reduction completion timing (time t22) of the gear based on the backlash angle calculated in this way and the designed backlash value described above. The PCM 50 uses the time from time t21 to time t22 as the backlash reduction time. Then, when backlash reduction starts (time t21), the PCM 50 sets the timer corresponding to this backlash reduction time to perform countdown.

Figure 14:
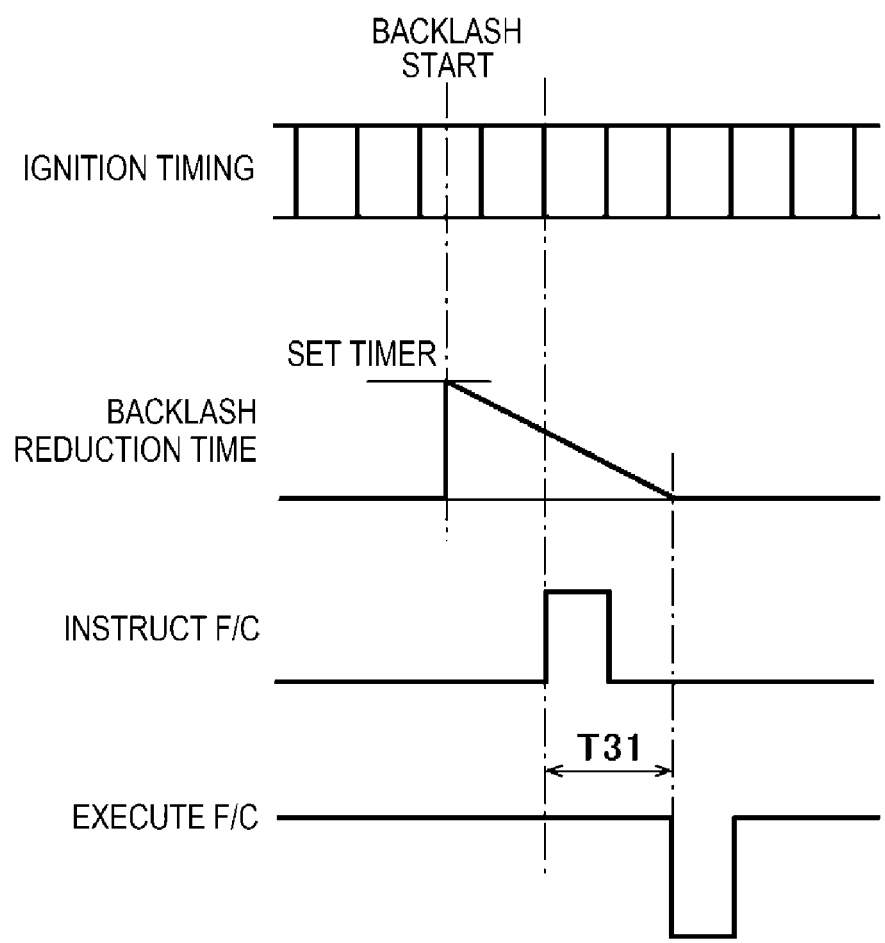
FIG. 14 is an explanatory diagram about F/C instruction timing for suppressing a backlash reduction shock according to the embodiment of the present invention.

Next, the F/C instruction timing for suppressing a backlash reduction shock will be specifically described with reference to FIG. 14. FIG. 14 is a time chart illustrating, in order from the top, the ignition timing, the backlash reduction time (timer), the F/C instruction timing, and the F/C execution timing.

As described above, it takes a time of approximately three ignitions from when a F/C command is issued to when F/C is actually performed on the engine 10. Accordingly, when setting the timer so as to correspond to the backlash reduction time, the PCM 50 calculates the timing obtained by going back by time T31 (equivalent to three ignitions) from the timing (backlash reduction completion timing) at which the countdown of this timer ends, and issues a F/C command for the engine 10 when this calculated timing is reached. This actually executes F/C on the engine 10 at the backlash reduction completion timing.

Figure 15:
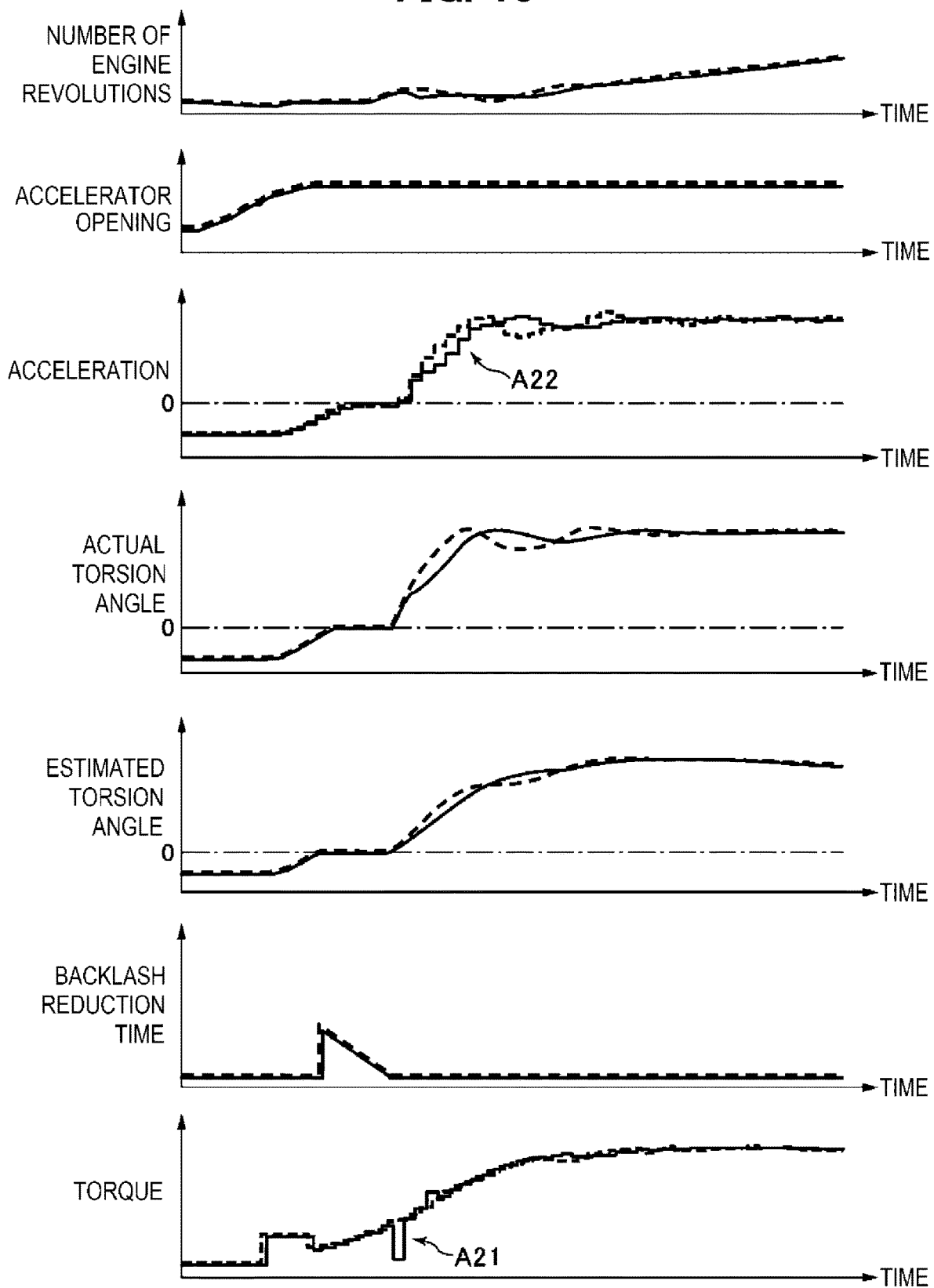
FIG. 15 is a time chart for describing the operation and effect of the backlash reduction F/C control according to the embodiment of present invention.

Next, the operation and effect of the backlash reduction F/C control according to the embodiment of present invention will be described with reference to FIG. 15. FIG. 15 is a time chart illustrating, in order from the top, the number of engine revolutions, the accelerator opening, the acceleration, the actual torsion angle, the estimated torsion angle, the backlash reduction time (timer), and the engine torque. In FIG. 15, the solid line represents the result when the backlash reduction F/C control according to the embodiment is executed and the dotted line represents the result when the backlash reduction F/C control according to the embodiment is not executed. It is assumed that the vehicle 500 accelerates in FIG. 15.

In the embodiment, the PCM 50 executes F/C on one cylinder 11 of the engine 10 (see arrow A21) via the backlash reduction F/C control at the backlash reduction completion timing during acceleration, that is, at the timing the countdown of the timer corresponding to the backlash reduction time ends (the torsion angle of the drive shaft 209 changes in the drive direction from zero at this timing). By executing such backlash reduction F/C control, body vibrations (backlash reduction shock) after completion of backlash reduction is appropriately suppressed as compared with the case in which the backlash reduction F/C control is not executed (see arrow A22).

The reason why F/C is executed only on one cylinder 11 in the backlash reduction F/C control because emission is ensured. However, when emission does not degrade even if F/C is executed on two or more cylinders 11 or when priority is given to the suppression of a backlash reduction shock (vibration suppression) over emission, F/C may be executed on two or more cylinders 11 in the backlash reduction F/C control.

(Torque F/C Control)

Next, the torque F/C control executed in step S111 in FIG. 5 will be specifically described. As described above, the PCM 50 executes the torque F/C control for stopping (F/C) the fuel supply to the engine 10 when the vehicle 500 decelerates.

Figure 16:
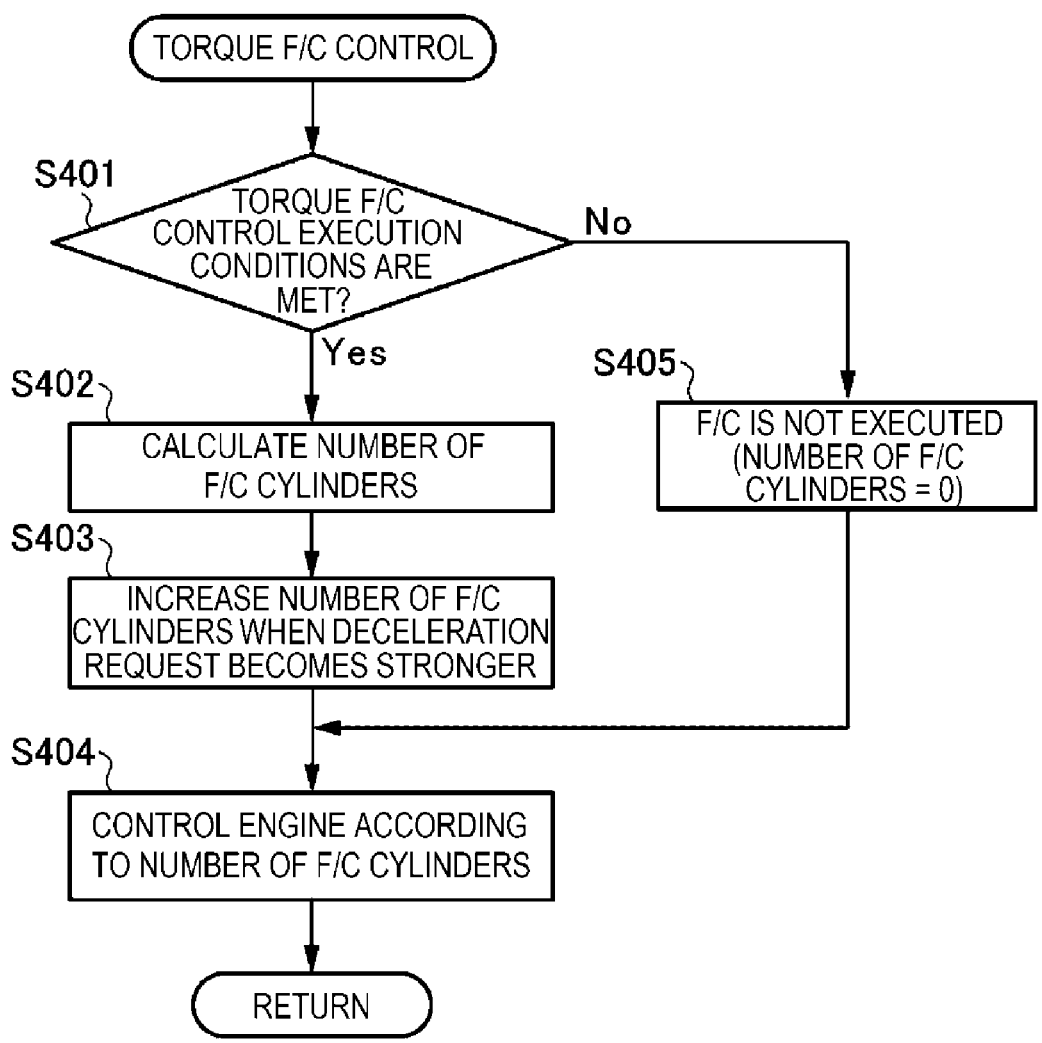
FIG. 16 is a flowchart illustrating torque F/C control according to the embodiment of present invention.

FIG. 16 is a flowchart illustrating the torque F/C control according to the embodiment of present invention. Basically, this torque F/C control is executed when the vehicle 500 decelerates.

When the torque F/C control is started, in step S401, PCM first determines whether the torque F/C control execution conditions are met. Specifically, the PCM 50 performs determination based on the following five conditions: (i) the accelerator opening is reduced from the accelerator opening equal to or more than a predetermined accelerator opening at a predetermined speed or higher, (ii) the prohibit conditions for torque F/C control are not met (specifically, F/C by another control, such as the backlash reduction F/C control described above) is not operating, (iii) the number of engine revolutions is equal to or more than a predetermined value and the gear stage is equal to or more than a predetermined value, (iv) the F/C permission zone is entered, and (v) the condition regarding the engine charging efficiency is met (specifically, the actual air amount does not follow the target air amount). That is, the PCM 50 determines that the torque F/C control execution conditions are met when all the five conditions (i) to (v) are met and does not determine that the torque F/C control execution conditions are not met when at least one of the five conditions (i) to (v) is not met.

When it is determined that the torque F/C control execution conditions are met in step S401 (Yes in step S401), the PCM 50 proceeds to step S402 and calculates the number of cylinders (the number of F/C cylinders) on which F/C is executed among all the cylinders 11 of the engine 10. Specifically, the PCM 50 calculates the ratio (target torque/retard limit torque) of the target torque to the minimum feasible torque (the torque obtained by retarding the ignition timing to the limit and is referred to below as the "retard limit torque") and, based on this ratio, calculates the number of cylinders that can achieve the target torque. The value obtained by subtracting this feasible number of cylinders from the total number of cylinders is the number of F/C cylinders. The equation for calculating the number of F/C cylinders is represented by "number of F/C cylinders=total number of cylinders−{(target torque/retard limit torque)× total number of cylinders}." Basically, since the vehicle 500 is decelerating, there is a tendency for "target torque<retard limit torque," that is, the ratio "target torque/retard limit torque" to become less than 1 (less than 100%).

Next, in step S403, the PCM 50 increases the number of F/C cylinders when the driver's deceleration request becomes stronger after step S402. The PCM 50 maintains the number of F/C cylinders when the deceleration request does not change. Then, the PCM 50 proceeds to step S404 and controls the engine 10 according to the number of F/C cylinders obtained as described above. Specifically, the PCM 50 controls the fuel injection valve 13 so as to stop the fuel supply to the cylinders 11 that correspond to the number of F/C cylinders of all the cylinders 11.

In contrast, when it is not determined that the torque F/C control execution conditions are met (No in step S401), the PCM 50 proceeds to step S405. In this case, the PCM 50 does not execute F/C on the engine 10 (step S405). The PCM 50 sets the number of F/C cylinders to zero so as to control the engine 10 as usual without executing F/C in step S404.

After step S404, the PCM 50 ends the torque F/C control and returns to the main routine (FIG. 5).

(Backlash Torsion Control)

Next, the backlash torsion control performed in step S112 in FIG. 5 will be specifically described. As this backlash torsion control, the PCM 50 executes F/C on the engine 10 to suppress body vibrations (backlash reduction shock) that occur when the backlash of the gear is reduced and body vibrations caused by the torsion of the drive shaft 209 during deceleration of the vehicle 500.

Figure 17:
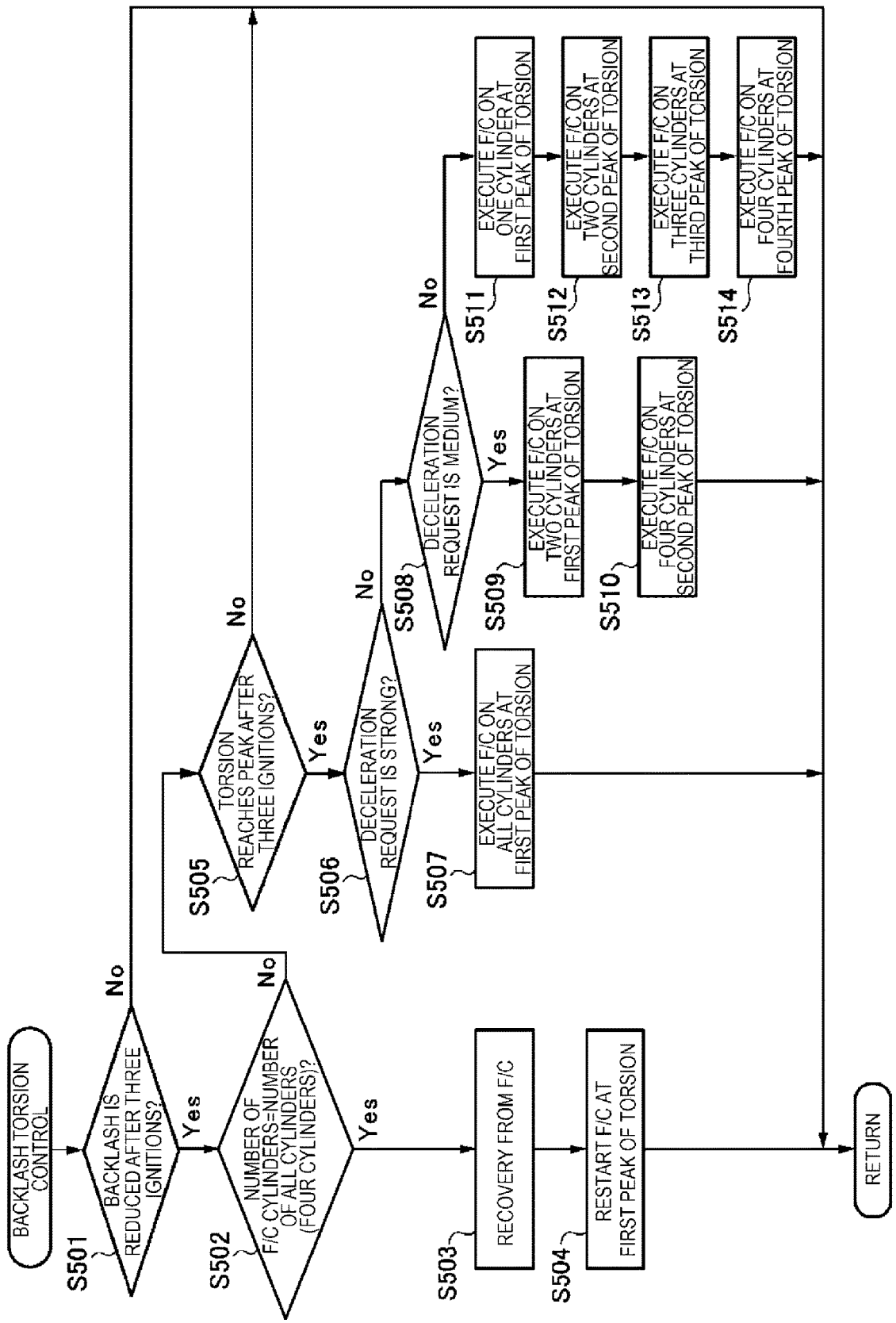
FIG. 17 is a flowchart illustrating backlash torsion control according to the embodiment of the present invention.
Figure 18:
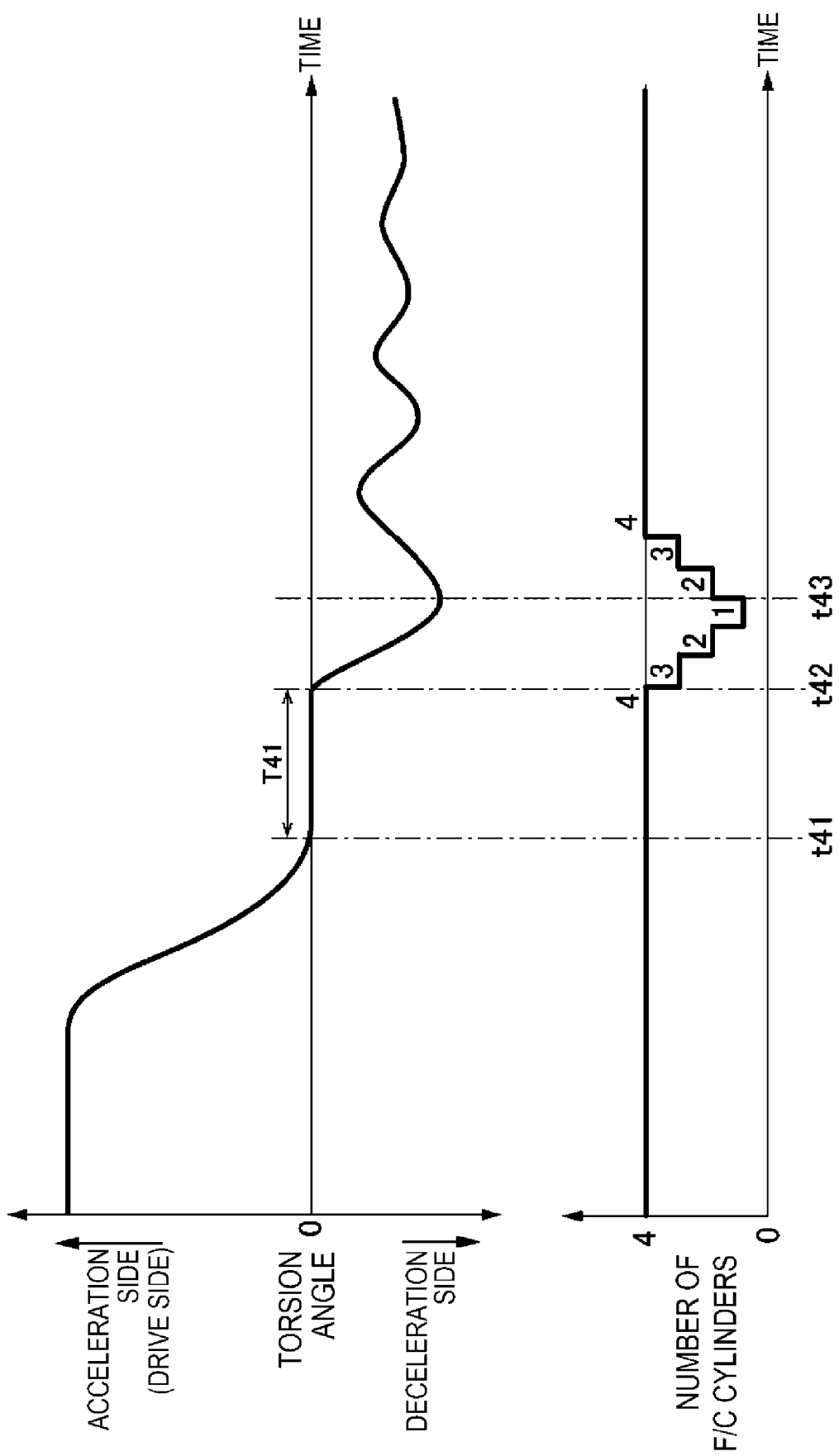
FIG. 18 is a time chart illustrating first control of the backlash torsion control according to the embodiment of the present invention.
Figure 19:
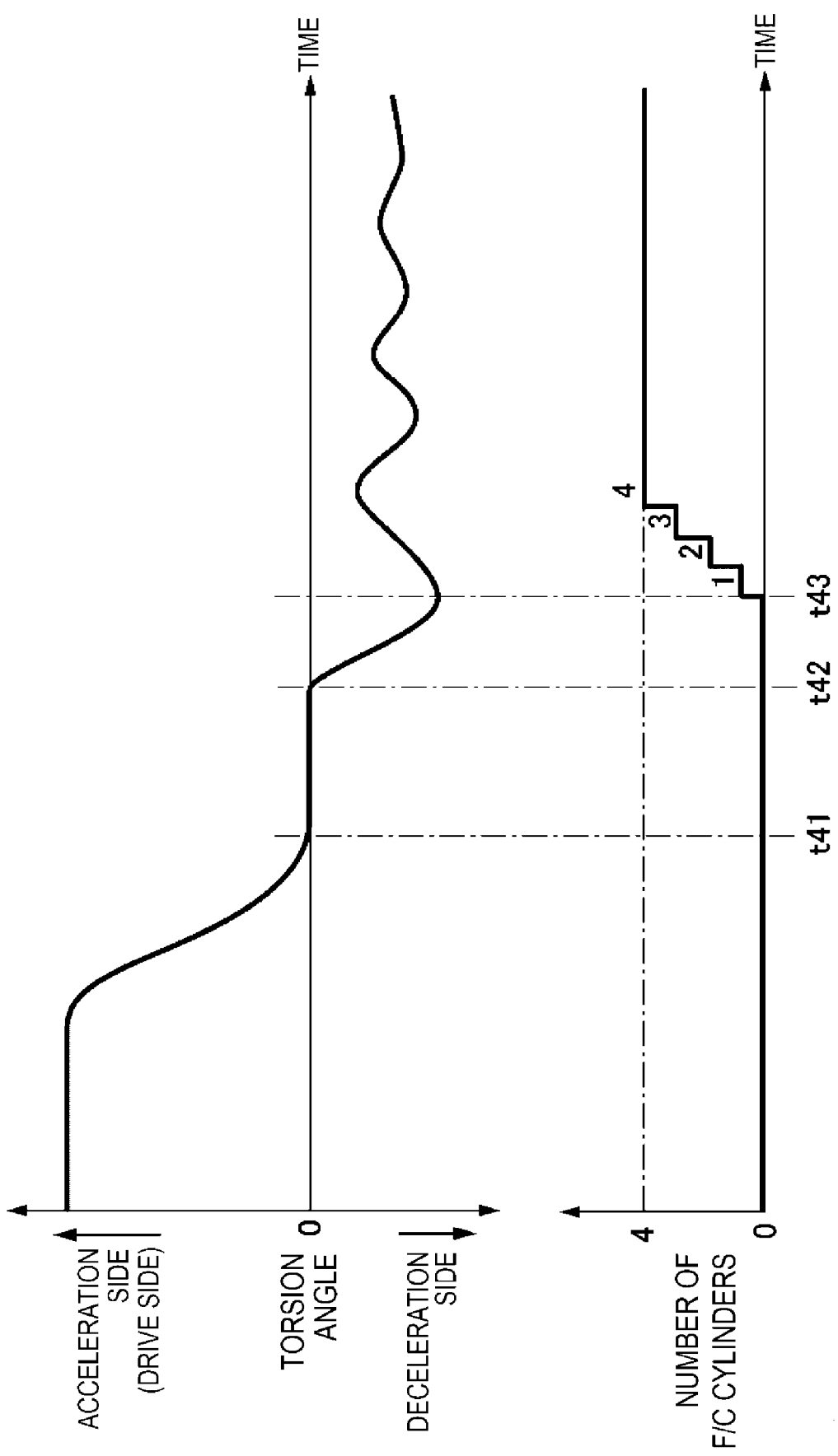
FIG. 19 is a time chart illustrating second control of the backlash torsion control according to the embodiment of the present invention.
Figure 20:
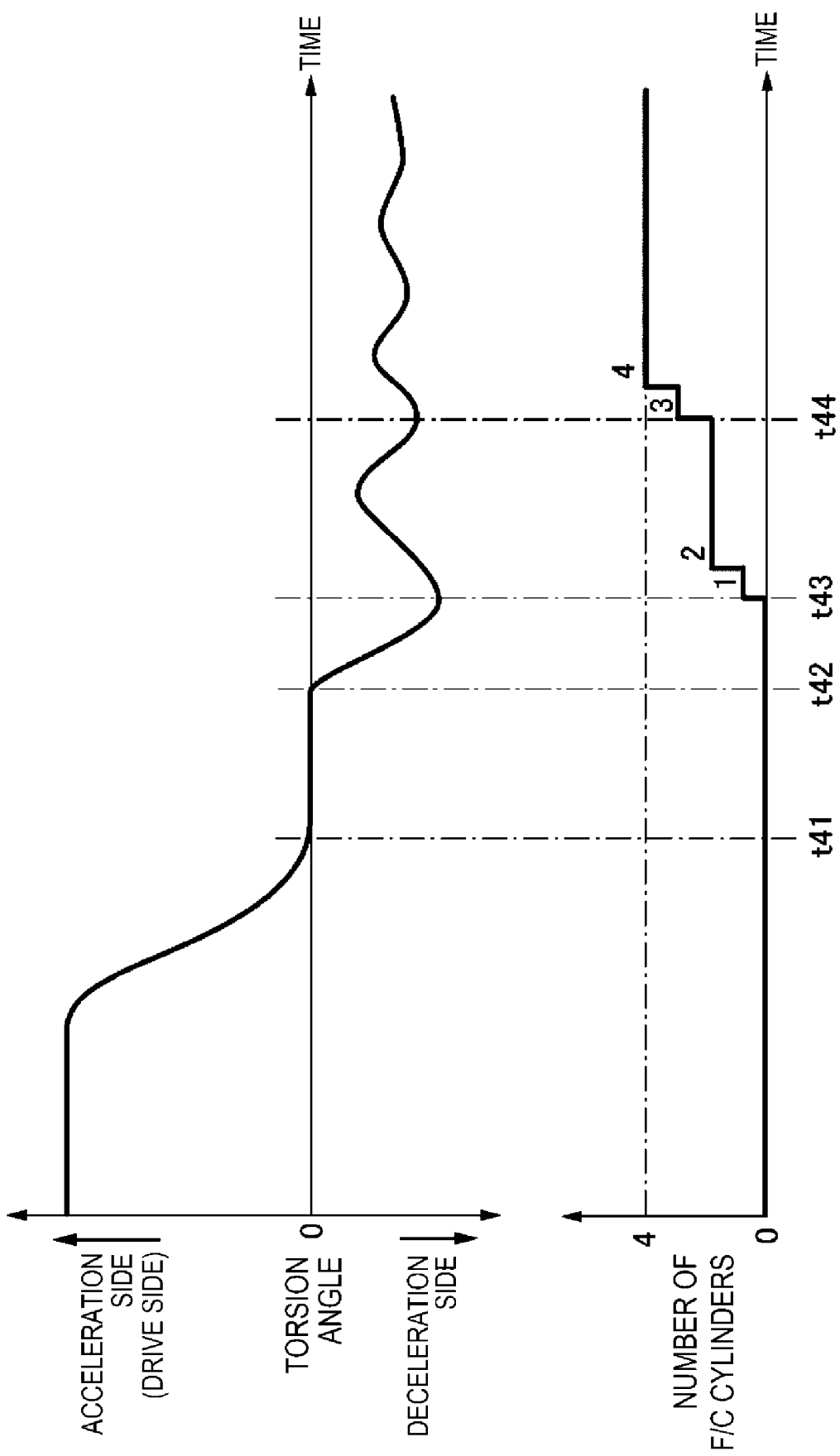
FIG. 20 is a time chart illustrating third control of the backlash torsion control according to the embodiment of the present invention.
Figure 21:
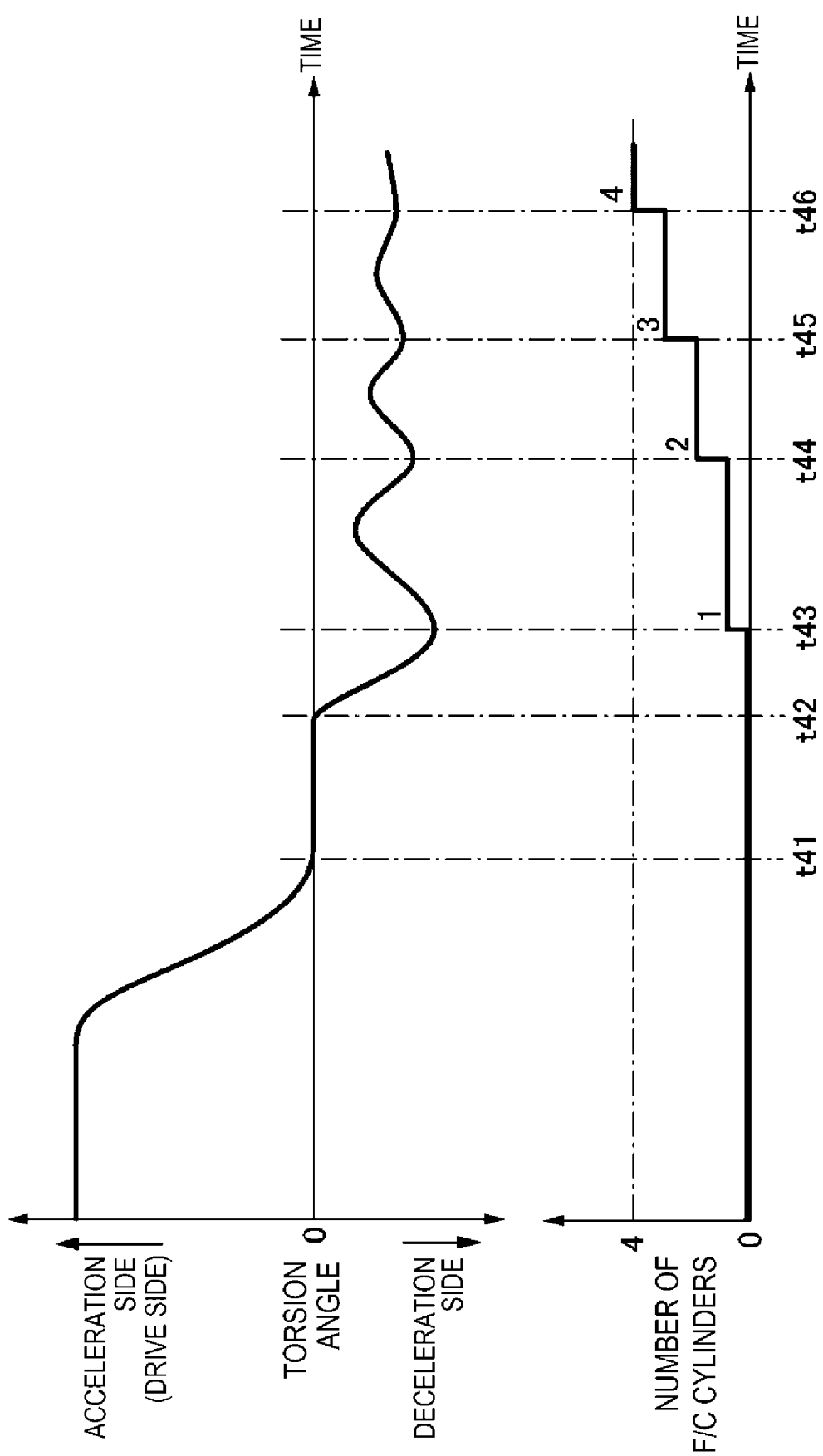
FIG. 21 is a time chart illustrating fourth control of the backlash torsion control according to the embodiment of the present invention.

The backlash torsion control according to the embodiment of the present invention will be described with reference to FIGS. 17 to 21. FIG. 17 is a flowchart illustrating the backlash torsion control according to the embodiment of the present invention, FIG. 18 is a time chart illustrating first control of the backlash torsion control according to the embodiment of the present invention, FIG. 19 is a time chart illustrating second control of the backlash torsion control according to the embodiment of the present invention, FIG. 20 is a time chart illustrating third control of the backlash torsion control according to the embodiment of the present invention, and FIG. 21 is a time chart illustrating fourth control of the backlash torsion control according to the embodiment of the present invention.

In describing the backlash torsion control, the case in which the total number of cylinders of the engine 10 is four, that is, the case in which the engine 10 is a four-cylinder engine, will be taken as an example. However, it will be appreciated that application of the backlash torsion control according to the embodiment is not limited to a four-cylinder engine, that is, application of the backlash torsion control according to the embodiment can be applied to other multiple-cylinder engines.

The backlash torsion control in FIG. 17 is executed typically when the vehicle 500 decelerates. When this backlash torsion control is started, the PCM 50 first determines in step S501 whether the backlash of the gear is reduced after three ignitions of the engine 10 based on the result of the backlash-torsion state quantity estimation processing described above. In this case as well, the backlash reduction time may be used to make determination as in the backlash reduction F/C control (see step S301 in FIG. 12).

In step S501, when it is not determined that the backlash is reduced after three ignitions (No in step S501), the PCM 50 ends the backlash torsion control and returns to the main routine (FIG. 5). In contrast, when it is determined that the backlash is reduced after three ignitions (Yes in step S501), the PCM 50 proceeds to step S502 and determines whether the number of F/C cylinders is the total number of cylinders (four cylinders). That is, the PCM 50 determines whether all the cylinders 11 are set as the targets of F/C by the torque F/C control described above. The determination in step S502 is equivalent to the determination as to whether the driver's deceleration request is very strong.

When it is determined that the number of F/C cylinders is the total number of cylinders in step S502 (Yes in step S502), the PCM 50 proceeds to step S503. In this case, the PCM 50 executes the first control of the backlash torsion control in steps S503 and S504. Here, the first control will be specifically described with reference to FIG. 18. This first control is the control executed when the driver's deceleration request is very strong.

FIG. 18 illustrates the torsion angle of the drive shaft 209 in the upper portion and the number of F/C cylinders in the lower portion. Here, it is assumed that the vehicle 500 is decelerating because the accelerator is off, and the F/C is executed on all the cylinders 11 (four cylinders). In this case, the torsion angle of the drive shaft 209 reduces to zero (time t41) and, after the lapse of time T41, the torsion angle of the drive shaft 209 starts changing in the deceleration direction (time t42). The period from time t41 to time t42 corresponds to the period from the start of backlash reduction of the gear to the completion of backlash reduction. After time t42, periodic torsion due to the travel resistance occurs in the drive shaft 209 according to the natural frequency thereof.

In the first control, the PCM 50 performs gradual recovery from F/C when the torsion angle of the drive shaft 209 changes in the deceleration direction from zero (time t42) in step S503. Specifically, the PCM 50 increases the torque of the engine 10 by gradually restarting the fuel supply to the cylinders 11 for which the fuel supply has been stopped, that is, by sequentially restarting the fuel supply for each cylinder. This suppresses vibrations (backlash reduction shock) that occur when backlash reduction is completed.

After that, in step S504, the PCM 50 gradually restarts F/C when the torsion angle of the drive shaft 209 reaches the first peak (referred to below as "deceleration peak" as appropriate) in the first deceleration direction (time t43). Specifically, after a lapse of the time of one-fourth the period corresponding to the natural frequency of the drive shaft 209 from time t42, the PCM 50 reduces the torque of the engine 10 by gradually stopping the fuel supply to the cylinders 11 again (that is, by sequentially restarting F/C for each cylinder) for which the fuel supply has been restarted. This suppresses a rise in the torsion of the drive shaft 209 after the deceleration peak, thereby suppressing vibrations caused by the torsion of the drive shaft 209. The first control described above can appropriately suppress both vibrations (backlash reduction shock) that occur when the backlash is reduced and vibrations caused by the torsion of the drive shaft 209.

Returning to FIG. 17, when it is not determined that the number of F/C cylinders is the total number of cylinders in step S502 (No in step S502), the PCM 50 proceeds to step S505 and determines whether the torsion of the drive shaft 209 reaches the peak (deceleration peak) after three ignitions. The PCM 50 makes the determination in step S505 by calculating the timing at which the torsion becomes peak based on one-fourth the cycle corresponding to the natural frequency of the drive shaft 209, calculates, based on this timing, the timing traced back by the time corresponding to three ignitions.

When it is not determined that the torsion becomes peak after three ignitions in step S505 (No in step S505), the PCM 50 ends the backlash torsion control and returns to the main routine (FIG. 5). In contrast, when it is determined that the torsion becomes peak after three ignitions (Yes in step S505), the PCM 50 proceeds to step S506 and determines whether the driver's deceleration request is relatively strong. Specifically, the PCM 50 determines whether the driver's deceleration request is relatively strong based on at least one or more of the gear stage, the number of engine revolutions, and the engine torque. The level of the deceleration request determined in step S506 is smaller than the level of the deceleration request required when the first control described above is executed. For example, the PCM 50 determines that the deceleration request is relatively strong in step S506 when the gear stage is third or higher, the number of engine revolutions is 3000 rpm or higher, and the engine torque is 150 Nm or higher.

When it is determined that the deceleration request is relatively strong in step S506 (Yes in step S506), the PCM 50 proceeds to step S507. In this case, the PCM 50 executes the second control of the backlash torsion control in step S507. Here, the second control will be specifically described with reference to FIG. 19.

FIG. 19 illustrates the torsion angle of the drive shaft 209 in the upper portion and the number of F/C cylinders in the lower portion. Here, it is assumed that the vehicle 500 is decelerating, but F/C is not yet executed (number of F/C cylinders=0). Since changes in the torsion angle of the drive shaft 209 illustrated in FIG. 19 are the same as those in FIG. 18, the description with reference to FIG. 19 is omitted.

In the second control, the PCM 50 executes F/C on all the cylinders 11 when the torsion angle of the drive shaft 209 reaches the first deceleration peak in step S507 (time t43). Specifically, the PCM 50 reduces the torque of the engine 10 by sequentially stopping the fuel supply to each cylinder to stop the fuel supply to all the cylinders 11. This suppresses arise in the torsion of the drive shaft 209 after the deceleration peak, thereby suppressing vibrations caused by the torsion of the drive shaft 209. According to the second control described above, it is possible to appropriately suppress vibrations caused by the torsion of the drive shaft 209 while still meeting the deceleration request.

Returning to FIG. 17, when it is not determined that the deceleration request is relatively strong in step S506 (No in step S506), the PCM 50 proceeds to step S508 and determines whether the driver's deceleration request is medium. Specifically, the PCM 50 determines whether the driver's deceleration request is medium based on at least one of the gear stage, the number of engine revolutions, and the engine torque. It is assumed that the level of the deceleration request determined in step S508 is smaller than the level of the deceleration request determined in step S506. For example, the PCM 50 determines that the deceleration request is medium in step S508 when the number of engine revolutions is 1500 rpm or higher and the engine torque is 50 Nm or higher.

When it is determined that the deceleration request is medium in step S508 (Yes in step S508), the PCM 50 proceeds to step S509. In this case, the PCM 50 executes the third control of the backlash torsion control insteps S509 and S510. Here, the third control will be specifically described with reference to FIG. 20.

FIG. 20 illustrates the torsion angle of the drive shaft 209 in the upper portion and the number of F/C cylinders in the lower portion. Here, it is assumed that the vehicle 500 is decelerating, but F/C is not yet executed (number of F/C cylinders=0). Since changes in the torsion angle of the drive shaft 209 illustrated in FIG. 20 are the same as those in FIG. 18, the description thereof is omitted.

In the third control, the PCM 50 executes F/C on two cylinders 11 of the four cylinders when the torsion angle of the drive shaft 209 reaches the first deceleration peak (time t43) in step S509. Specifically, the PCM 50 reduces the torque of the engine 10 by sequentially stopping the fuel supply to each cylinder to stop the fuel supply to the two cylinders 11. After that, the PCM 50 executes F/C on another two cylinders 11 when the torsion angle of the drive shaft 209 reaches the second deceleration peak (time t44) in step S510. Specifically, the PCM 50 reduces the torque of the engine 10 by sequentially stopping the fuel supply to each cylinder to stop the fuel supply to the two remaining cylinders 11. This completes F/C on all the cylinders 11. The third control described above suppresses a rise in the torsion of the drive shaft 209 after the first and second deceleration peaks, thereby suppressing vibrations caused by the torsion of the drive shaft 209. This can effectively suppress vibrations caused by the torsion of the drive shaft 209 while meeting the deceleration request to some extent.

Returning to FIG. 17, when it is not determined that the deceleration request is medium in step S508 (No in step S508), that is, when the deceleration request is weak, the PCM 50 proceeds to step S511. In this case, the PCM 50 executes the fourth control of the backlash torsion control insteps S511 to S514. Here, the fourth control will be specifically described with reference to FIG. 21.

FIG. 21 illustrates the torsion angle of the drive shaft 209 in the upper portion and the number of F/C cylinders in the lower portion. Here, it is assumed that the vehicle 500 is decelerating, but F/C is not yet executed (number of F/C cylinders=0). Since changes in the torsion angle of the drive shaft 209 illustrated in FIG. 21 are the same as those in FIG. 18, the description thereof is omitted.

In the fourth control, in step S511, when the torsion angle of the drive shaft 209 reaches the first deceleration peak (time t43), the PCM 50 reduces the torque of the engine 10 by executing F/C on one cylinder 11 (number of F/C cylinders=1) of the four cylinders. Next, in step S512, when the torsion angle of drive shaft 209 reaches the second deceleration peak (time t44), the PCM 50 reduces the torque of engine 10 by executing F/C on another cylinder 11 (number of F/C cylinders=2). Next, in step S513, when the torsion angle of the drive shaft 209 reaches the third deceleration peak (time t45), the PCM 50 reduces the torque of engine 10 by executing F/C on another cylinder 11 (number of F/C cylinders=3). Next, in step S514, when the torsion angle of the drive shaft 209 reaches the fourth deceleration peak (time t46), the PCM 50 reduces the torque of the engine 10 by executing F/C on another cylinder 11 (number of F/C cylinders=4). This completes F/C on all the cylinders 11. The fourth control described above suppresses a rise in the torsion of the drive shaft 209 after the first to forth deceleration peaks, thereby suppressing vibrations caused by the torsion of the drive shaft 209. This can more effectively suppress vibrations caused by the torsion of the drive shaft 209.

After steps S504, S507, S510, and S514, the PCM 50 ends the backlash torsion control and returns to the main routine (FIG. 5).

<Operation and Effect>

Next, the operation and effect of the control device and the control method for a vehicle according to the embodiment of the present invention will be described.

In the embodiment, the PCM 50 sets the target torsion angle of the drive shaft 209 based on the target acceleration according to the accelerator opening, sets the target torque of the engine 10 based on this target torsion, and controls the engine 10. This can apply the target torque that considers the behavior of the drive shaft 209 during acceleration or deceleration (that is, during transient of torque increase or torque reduction) and secure the response (transient response) during acceleration or deceleration while suppressing body vibrations caused by the torsion of the drive shaft 209.

In addition, since the PCM 50 sets the target torque based on the torsion angular torque according to the torsion angle of the drive shaft 209 and the torsion angular velocity torque according to the torsion angular velocity of the drive shaft 209 in the embodiment, the target torque that appropriately considers the behavior of the drive shaft 209 can be applied. Application of such a target torque can appropriately generate the actual torsion angle corresponding to the target torsion angle and effectively suppress vibrations caused by the torsion of the drive shaft 209.

In addition, since the target torque has a time waveform that increases according to the torsion angle torque and temporarily drops according to the angular velocity torque in this increasing process in the embodiment, the target torque that more effectively considers the behavior of the drive shaft 209 during transient of torque increase or torque reduction can be applied.

In addition, since the PCM 50 corrects the target torque based on the difference between the target torsion angle set as described above and the actual torsion angle of the drive shaft 209 in the embodiment, the actual torsion angle corresponding to the target torsion angle can be achieved appropriately.

In addition, in the embodiment, the PCM 50 can accurately calculate the actual torsion angle based on the difference between the angular velocity on the side of the engine 10 and the angular velocity on the side of the wheels. In particular, since the PCM 50 obtains the angular velocity on the side of the engine 10 based on the torque of the engine 10 and the angular velocity on the side of the wheels based on the travel resistance of the vehicle 500, the actual torsion angle can be obtained more accurately.

In addition, since the PCM 50 corrects the target torque so as to compensate for the response delay of the throttle valve 5 as the air amount adjustment device in the embodiment, it is possible to appropriately suppress the delay of the torque output of the engine 10 due to the response delay of the throttle valve 5 with respect to the driver's acceleration or deceleration request.

<Modification>

Figure 22:
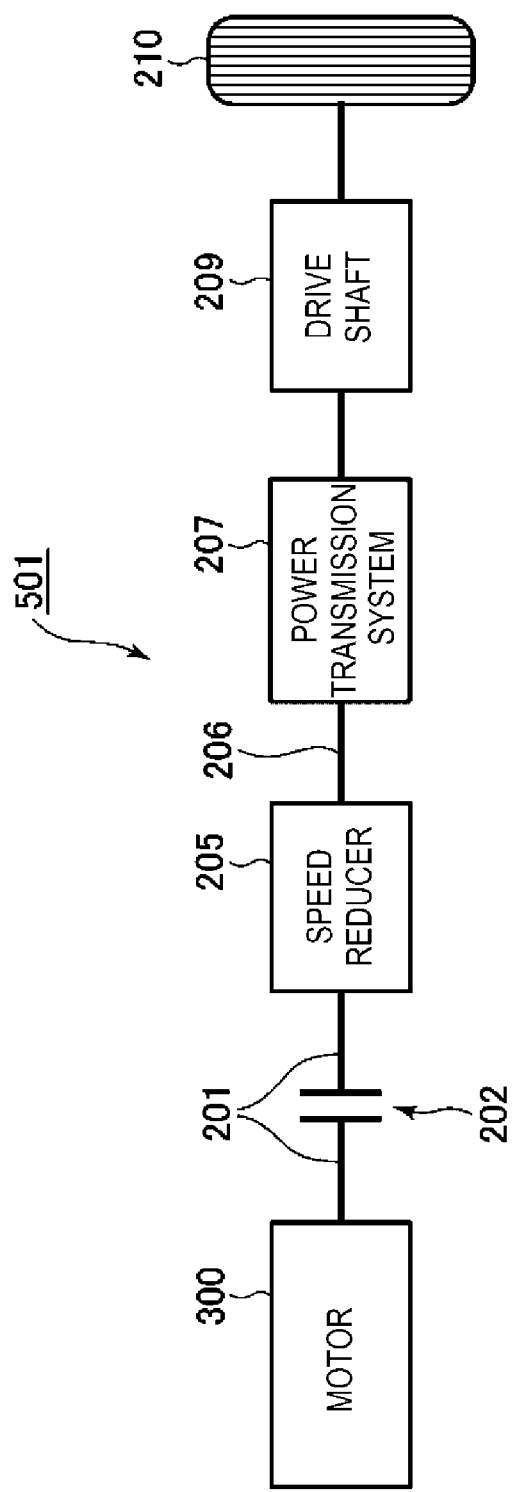
FIG. 22 is a schematic structural diagram illustrating a vehicle to which a control device for vehicle according to a modification of the embodiment of the present invention has been applied.

Although an example in which the present invention is applied to the vehicle 500 with an engine 10 as a drive source has been described in the embodiment described above, the present invention may be applied to a vehicle 501 (a so-called electric vehicle (EV vehicle)) with a motor 300 as a drive source as illustrated in FIG. 22 in a modification. In this vehicle 501, the motor 300 is connected to the speed reducer 205 via the clutch 202 (the other structure is the same as that of the vehicle 500). In such a modification, the PCM 50 (controller) (not illustrated) only needs to adjust the torque of the motor 300 by controlling the motor 300 via an inverter (not illustrated). In another modification, the present invention may be applied to a vehicle (so-called hybrid vehicle) with an engine and a motor as drive sources.

REFERENCE CHARACTERS LIST

5: throttle valve
10: engine
11: cylinder
13: fuel injection valve
14: spark plug
30: accelerator position sensor
50: PCM
100: engine system
202: clutch
204: transmission
207: power transmission system
209: drive shaft
300: motor
500, 501: vehicle

The invention claimed is:

1. A control device for a vehicle, comprising:
an accelerator position sensor that detects an accelerator opening;
a torque adjustment mechanism that adjusts a torque of a drive source of the vehicle; and
a controller that controls the torque adjustment mechanism based on the accelerator opening detected by the accelerator position sensor,
wherein the controller:
sets a target acceleration based on the accelerator opening,
sets a target torsion angle of a drive shaft that drives a wheel of the vehicle based on the target acceleration,
sets a target torque of the drive source based on the target torsion, and
controls the torque adjustment mechanism based on the target torque.

2. The control device for a vehicle according to claim 1, wherein the controller sets the target torque based on a first torque according to the torsion angle of the drive shaft and a second torque according to a torsion angular velocity of the drive shaft to achieve the target torsion angle.

3. The control device for a vehicle according to claim 2, wherein the target torque increases according to the first torque and, in the increasing process, has a time waveform including a temporary drop according to the second torque.

4. The control device for a vehicle according to claim 3, wherein the controller corrects the target torque based on a difference between the target torsion angle and an actual torsion angle of the drive shaft.

5. The control device for a vehicle according to claim 4, wherein the controller calculates the actual torsion angle based on a difference between an angular velocity on a side of the drive source and an angular velocity on a side of the wheel.

6. The control device for a vehicle according to claim 5, wherein the controller:
calculates the angular velocity on the side of the drive source based on the torque of the drive source,
calculates the angular velocity on the side of the wheel based on a travel resistance of the vehicle, and
calculates the actual torsion angle based on the difference between the angular velocities.

7. The control device for a vehicle according to claim 6, wherein the controller corrects the target torque from when the actual torsion angle becomes zero to when the actual torsion angle changes in a drive direction of the wheel or a deceleration direction.

8. The control device for a vehicle according to claim 7, wherein the controller controls the torque adjustment mechanism so as to reduce the torque of the drive source when the actual torsion angle changes in the drive direction of the wheel from zero.

9. The control device for a vehicle according to claim 8, wherein the drive source includes an engine,
the torque adjustment mechanism includes an air amount adjustment device that adjusts an amount of air supplied to the engine, and
the controller corrects the target torque so as to compensate for a response delay of the air amount adjustment device.

10. The control device for a vehicle according to claim 8, wherein the drive source includes an engine or a motor.

11. A control method for a vehicle having an accelerator position sensor that detects an accelerator opening and a torque adjustment mechanism that adjusts a torque of a drive source of the vehicle, the control method comprising:
a step of setting a target acceleration of the vehicle based on the accelerator opening;
a step of setting a target torsion angle of a drive shaft that drives a wheel of the vehicle based on the target acceleration;
a step of setting a target torque of the drive source based on the target torsion; and
a step of controlling the torque adjustment mechanism based on the target torque.

12. The control device for a vehicle according to claim 1, wherein the controller corrects the target torque based on a difference between the target torsion angle and an actual torsion angle of the drive shaft.

13. The control device for a vehicle according to claim 1, wherein the controller:
   calculates an actual torsion angle of the drive shaft based on a difference between an angular velocity on the side of the drive source and an angular velocity on the side of the wheel, and
   corrects the target torque from when the actual torsion angle becomes zero to when the actual torsion angle changes in a drive direction of the wheel or a deceleration direction.

14. The control device for a vehicle according to claim 1, wherein the controller:
   calculates an actual torsion angle of the drive shaft based on a difference between an angular velocity on the side of the drive source and an angular velocity on the side of the wheel, and
   controls the torque adjustment mechanism so as to reduce the torque of the drive source when the actual torsion angle changes in the drive direction of the wheel from zero.

15. The control device for a vehicle according to claim 1, wherein the drive source includes an engine,
   the torque adjustment mechanism includes an air amount adjustment device that adjusts an amount of air supplied to the engine, and
   the controller corrects the target torque so as to compensate for a response delay of the air amount adjustment device.

16. The control device for a vehicle according to claim 1, wherein the drive source includes an engine or a motor.

17. The control device for a vehicle according to claim 12, wherein the controller:
   calculates the actual torsion angle of the drive shaft based on a difference between an angular velocity on the side of the drive source and an angular velocity on the side of the wheel, and
   corrects the target torque from when the actual torsion angle becomes zero to when the actual torsion angle changes in a drive direction of the wheel or a deceleration direction.

18. The control device for a vehicle according to claim 12, wherein the controller:
   calculates the actual torsion angle of the drive shaft based on a difference between an angular velocity on the side of the drive source and an angular velocity on the side of the wheel, and
   controls the torque adjustment mechanism so as to reduce the torque of the drive source when the actual torsion angle changes in the drive direction of the wheel from zero.

19. The control device for a vehicle according to claim 12, wherein the drive source includes an engine,
   the torque adjustment mechanism includes an air amount adjustment device that adjusts an amount of air supplied to the engine, and
   the controller corrects the target torque so as to compensate for a response delay of the air amount adjustment device.

20. The control device for a vehicle according to claim 13, wherein the drive source includes an engine,
   the torque adjustment mechanism includes an air amount adjustment device that adjusts an amount of air supplied to the engine, and
   the controller corrects the target torque so as to compensate for a response delay of the air amount adjustment device.

* * * * *